United States Patent
Yamazaki et al.

(10) Patent No.: US 7,301,684 B2
(45) Date of Patent: Nov. 27, 2007

(54) SCANNING OPTICAL SYSTEM

(75) Inventors: Shoichi Yamazaki, Kanagawa (JP); Shuichi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/823,020

(22) Filed: Apr. 12, 2004

(65) Prior Publication Data
US 2004/0218243 A1 Nov. 4, 2004

(30) Foreign Application Priority Data
Apr. 23, 2003 (JP) ............................. 2003-118815

(51) Int. Cl.
*G02B 26/08* (2006.01)
(52) U.S. Cl. ...................... 359/212; 359/630; 359/850; 359/857
(58) Field of Classification Search ..................... None
See application file for complete search history.

(56) References Cited
U.S. PATENT DOCUMENTS 6,043,799 A * 3/2000 Tidwell ......................... 345/7
6,222,676 B1 4/2001 Togino et al.
6,333,820 B1 12/2001 Hayakawa et al.
7,027,229 B2 * 4/2006 Inoguchi et al. ............ 359/630

FOREIGN PATENT DOCUMENTS

| DE | 10127367 | 12/2002 |
|---|---|---|
| EP | 1 225 470 | 12/2001 |
| JP | 2001-281583 | * 10/2001 |
| JP | 2003029197 | 1/2003 |

* cited by examiner

*Primary Examiner*—James Phan
(74) *Attorney, Agent, or Firm*—Morgan & Finnegan LLP

(57) ABSTRACT

A scanning optical system capable of sufficiently enlarging an exit pupil and being reduced in size is disclosed. The scanning optical system has a scanning device used to scan light from a light source and a first optical system used to directs the light scanned by the scanning device to an exit pupil. The first surface has at least a reflective action and is decentered with respect to a central principal ray. The second surface reflects the light reflected by the first surface again toward the first surface. The first surface reflects the central principal ray, which has again been made incident to the first surface from the second surface, toward a side substantially opposite to a side toward which the central principal ray was reflected the last time with respect to a normal on a hit point of the central principal ray in the first surface.

8 Claims, 9 Drawing Sheets

(a) 10 %

(b) 5 %

SCANNING OPTICAL SYSTEM

BACKGROUND OF THE INVENTION

1. Field of the Invention

The present invention relates to a scanning optical system which performs optical scanning so as to form an image in an observer's eye or on a screen and can be observed and which is suitable for an image display apparatus, such as a head-mounted display (HMD) or a projector.

2. Description of the Related Art

Generally, an image display apparatus, such as a head-mounted display (HMD) or a projector, uses a transmission type liquid crystal, a reflection type liquid crystal, or an EL element as an original-image display element. However, recently, an image display apparatus which displays a two-dimensional image by using a light-beam-scanning means (see U.S. Pat. No. 5,467,104) has been proposed.

U.S. Pat. No. 5,467,104 discloses a scan type image display apparatus which scans beams of light of R, G, and B in a horizontal direction and in a vertical direction and forms an image directly on the retina of an observer through an optical system.

However, in the scan type image display apparatus disclosed in U.S. Pat. No. 5,467,104, optical scanning is required to be performed at very high speed, and therefore a very small device is used as an optical scanning means such as a mirror. Therefore, the scanned light beam becomes extremely thin, and the light beam at the position of the pupil of the observer also becomes very small in diameter, thus making it difficult to obtain an exit pupil having a sufficient diameter.

Techniques disclosed in U.S. Pat. No. 5,701,132 and in U.S. Pat. No. 5,757,544 can be mentioned as a method for enlarging such an exit pupil having a small diameter. In U.S. Pat. No. 5,701,132, the expansion angle of a light beam which has passed through an exit-pupil-enlarging means, such as a lens array or a diffusing plate, is increased by disposing the exit-pupil-enlarging means on an intermediate image plane having a curvature formed by a scanned light beam and by allowing the light beam to pass therethrough.

Likewise, in U.S. Pat. No. 5,757,544, an exit pupil is enlarged by allowing light made incident to an image display element, such as a liquid crystal illuminated with parallel rays of light, to pass through a diffusing plate, although the apparatus disclosed in this patent is not a scan type image display apparatus.

However, since the apparatuses disclosed in U.S. Pat. No. 5,701,132 and in U.S. Pat. No. 5,757,544 each use the exit pupil enlarging means of the intermediate image transmission type, an optical path becomes long, and the apparatus is easily enlarged in size.

Additionally, Japanese Patent Application Laid-open No. 2001-4955 proposes a relatively small-sized optical system in which light from a light source is changed into a slightly thick beam of light by using a decentration-free curved-surface optical system, and the light beam is guided to an eyeball while being reflected by a scanning means. In this publication, there is mention of an exit pupil being enlarged by a transmission-type diffusing plate, however, the system is inevitably enlarged in size, resulting from use of the transmission-type diffusing plate. In other words, in this case, the system can only be reduced to have approximately twice the size of a free curved surface prism known as representative of a small ocular optical system (which is disclosed in Japanese Patent No. 2911750 and is described in "Optics," Vol. 25, No. 1, pp. 2-7, 1996).

SUMMARY OF THE INVENTION

It is an object of the present invention to provide a scanning optical system capable of sufficiently enlarging an exit pupil and capable of being reduced in size, and to provide an image display apparatus using this.

The present invention as one aspect to achieve the object comprises a scanning device which scans light from a light source and a first optical system which directs the light scanned by the scanning device to an exit pupil. The first optical system comprises a first surface and a second surface. The first surface has at least a reflective action and is decentered with respect to a central principal ray. The second surface again reflects the light reflected by the first surface toward the first surface. Further, the first surface reflects the central principal ray, which has again been made incident to the first surface from the second surface, toward a side substantially opposite to a side toward which the central principal ray was reflected the last time with respect to a normal on a hit point of the central principal ray on the first surface.

The present invention as another aspect to achieve the object comprises a scanning device which scans light from a light source and a first optical system which directs the light scanned by the scanning device to an exit pupil. The first optical system comprises a decentered surface which is decentered with respect to an optical path of the light, and the first optical system reflects the light on the decentered surface a plurality of times. Additionally, the first optical system has a case where an inner product between outer products each formed by vectors of incident light and reflected light in the respective reflections performed the plurality of times is negative.

The present invention as still another aspect to achieve the object comprises a scanning device which scans light from a light source and a first optical system which directs the light scanned by the scanning device to an exit pupil. The first optical system comprises a first surface and a second surface, the first surface having at least a reflective action and being decentered with respect to a central principal ray, the second surface again reflecting the light reflected by the first surface toward the first surface. Furthermore, the first surface reflects the central principal ray, which has again been made incident to the first surface from the second surface, toward a side substantially opposite to a side toward which the central principal ray was reflected the last time with respect to a normal on a hit point of the central principal ray on the first surface. And, the second surface has a diffusing and reflecting action. Herein, the first optical system makes the light form an intermediate image either on the second surface or in the vicinity of the second surface.

The present invention as another aspect to achieve the object comprises a scanning device which scans light from a light source and a first optical system which directs the light scanned by the scanning device to an exit pupil. The first optical system comprises a first surface which is decentered with respect to an optical path and a second surface which has a diffusing and reflecting action, the first optical system reflects the light on the first surface a plurality of times via reflections on the second surface. Furthermore, the first optical system has a case where an inner product between outer products each formed by vectors of incident light and reflected light in the respective reflections performed the plurality of times is negative, and the first optical system makes the light form an intermediate image either on the second surface or in the vicinity of the second surface.

The present invention as still another aspect to achieve the object comprises a scanning device which scans light from a light source and a first optical system which directs the light scanned by the scanning device to an exit pupil. The first optical system comprises a plurality of rotationally asymmetric first reflective surfaces, and a second reflective surface, the plurality of first reflective surfaces are decentered with respect to an optical path and face each other, and the second reflective surface has a diffusing and reflecting action. Herein, the first optical system makes the light form an intermediate image either on the second reflective surface or in the vicinity of the second reflective surface, and the first optical system guides light reflected by the second reflective surface to the exit pupil so as to form an enlarged image.

The present invention as another aspect to achieve the object comprises a scanning device which scans light from a light source and a first optical system which directs the light scanned by the scanning device to an exit pupil. The first optical system comprises a plurality of surfaces including reflective surfaces, and a reflective area and a transmissive area are formed in the reflective surface, the transmissive area allowing the light from the scanning device to be made incident into the first optical system. Herein, the transmissive area is smaller in area than the reflective area.

Features of the scanning optical system and the image display apparatus of the present invention will be apparent from a description of concrete embodiments given below with reference to the attached drawings.

DETAILED DESCRIPTION OF THE PREFERRED EMBODIMENTS

Figure 1:
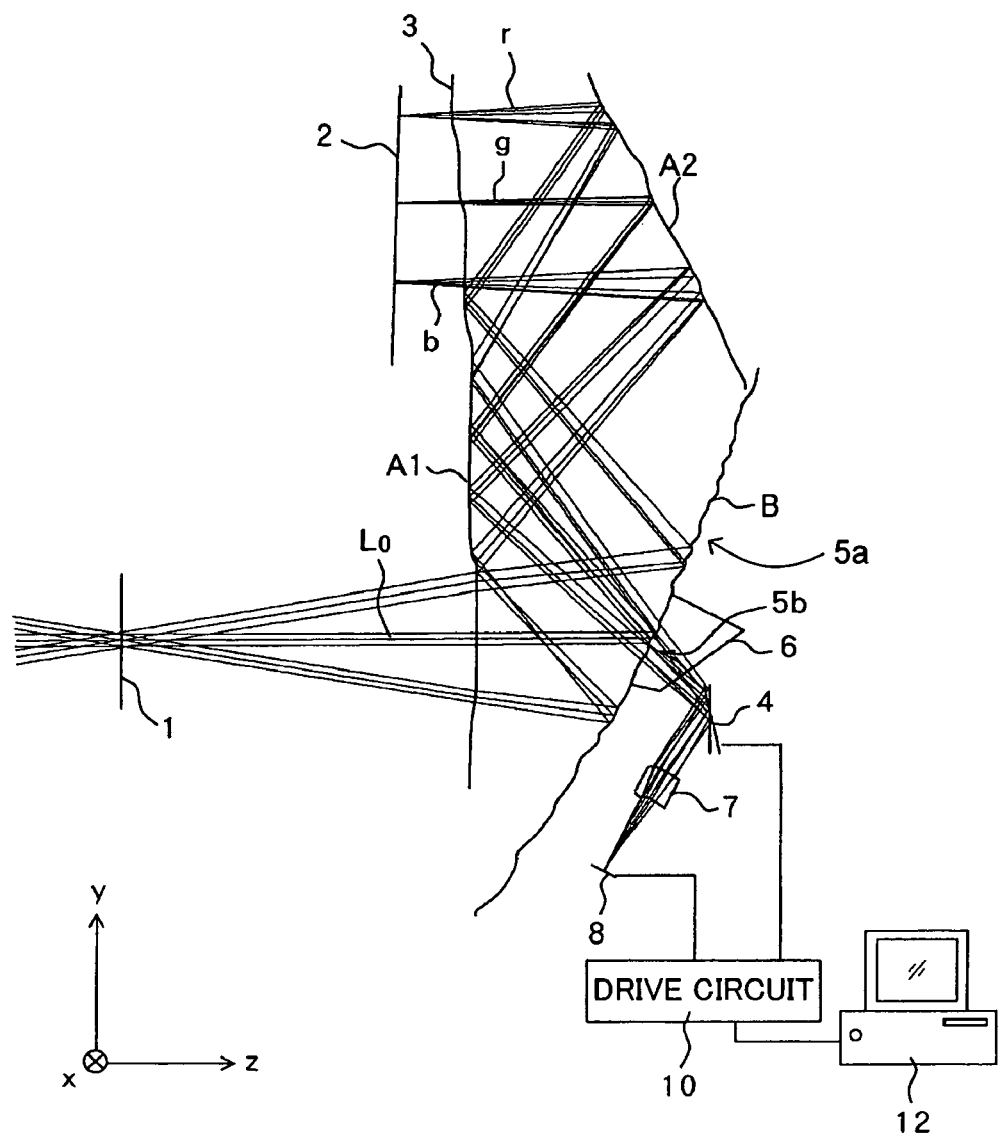
FIG. 1 is a view showing beam paths of the scanning optical system which is Embodiment 1 of the present invention.

Embodiments of the present invention will be hereinafter described with reference to the attached drawings.

Before describing each embodiment, a description will be given of the definitions of a generatrix section, a directrix section, a local generatrix section and a local directrix section which are used in each embodiment.

According to the definition of a conventional system which does not correspond to a decentered system, a yz section is a generatrix section (meridional section) according to the conventional definition, and an xz section is a directrix section (sagittal section) according to the conventional definition, where the z axis is an optical axis in each surface vertex coordinate system. However, since a decentered system is employed in each embodiment of the present invention, the local generatrix section and the local directrix section corresponding to the decentered system will be newly defined.

First, a ray which is emitted from a light source and which passes through the center of an enlarged image and through the center of an exit pupil of the optical system is defined as a central field-angle principal ray or as a central principal ray (hereinafter, referred to as "central principal ray"). The central principal ray is represented as LO in the drawing which corresponds to each embodiment.

A plane which includes the incident ray and emergent ray of the central principal ray on hit points of the central principal ray on optical surfaces is defined as the local generatrix section, and a plane which includes the hit point and which is perpendicular to the local generatrix section and parallel to the directrix section (ordinary directrix section) of each surface vertex coordinate system is defined as the local directrix section. A focal length in the local generatrix section and a focal length in the local directrix section are described later.

A description will now be given of primary features of the embodiments of the present invention.

1. The scanning optical system comprises a scanning device which scans light from a light source and a first optical system which directs the light scanned by the scanning device to an exit pupil. The first optical system has a first surface, which has at least a reflective action and is decentered with respect to a central principal ray, and a second surface, which again reflects the central principal ray reflected by the first surface toward the first surface. The first surface reflects the central principal ray, which has again been made incident to the first surface from the second surface, toward a side substantially opposite to a side toward which the central principal ray was reflected the last time with respect to a normal on a hit point of the central principal ray on the first surface.

Accordingly, the light from the scanning device creates a substantial overlapping between an optical path (first optical path: forward route) to a second surface, including the first reflection on the first surface and an optical path (second optical path: return route) including a reflection on the first surface after a reflection on the second surface (returning reflective surface), and therefore the optical system having a long optical path length can be brought into a small optical system.

Herein, focusing attention on the reflections on the first surface prior to and after the reflection on the second surface serving as a returning reflective surface, it can be also said that the directions of outer products each formed by a vector indicating an incident direction onto the first surface and a vector indicating a reflective direction therefrom in the forward route and the return route become almost exactly opposite. It is also possible to form an optical path by providing a plurality of surfaces each of which functions as a reflective surface in the forward route and in the return route.

A long optical path can be contained in a narrow space while controlling the occurrence of distortion by using the reflection on the returning reflective surface thus characterized, in comparison with so-called zigzag reflections performed between ordinary surfaces which face each other. Additionally, without being limited to two times, the reflection on the first surface may be performed three or more times, and the optical power of the first surface may be used.

Additionally, although a central principal ray is typified by a case in which all planes including incident light and reflected light on each surface including a returning reflective surface exist in the same plane, the planes including incident light and reflected light are not necessarily required to exist in the same plane. In other words, by the returning reflective surface, a component of a direction perpendicular to the aforementioned plane may be given to light reflected by the returning reflective surface. In this case, focusing attention on, for example, the first surface where a light beam is reflected toward the returning reflective surface and where a light beam reflected by the returning reflective surface is made incident, the directions of outer products each formed by a vector indicating an incident direction onto the first surface and a vector indicating a reflective direction therefrom in the forward route and the return route make an obtuse angle. The structure of the optical path can also be characterized by the fact that an inner product formed by the outer products becomes negative.

Additionally, not only in the returning reflective surface but also in other reflective surfaces, a component of a direction perpendicular to the aforementioned plane may be given to reflected light.

Thus, each reflective surface also has decentration in the direction perpendicular to the aforementioned plane with respect to a light beam, and the degree of freedom of an optical design can be increased.

1-2. Light from the light source passes through the scanning device and forms an intermediate image. The scanning device is disposed at a position conjugated with the exit pupil of the first optical system, and light from the scanning device forms a two-dimensional image on the intermediate image surface.

An optical system (relay optical system) which forms a light-source image on the intermediate image surface is provided. If the scanning device is disposed at a stopping-down position of the relay optical system so as to create a conjugate relationship between the stop (scanning device) in the relay optical system and the exit pupil of the optical system, a light beam is never eclipsed when an observer places his/her eye on the surface of the exit pupil.

1-3. In the first optical system, a light beam travels on the first optical path, is then reflected and returned, then travels on the second optical path, and is reflected by another reflective surface which is decentered with respect to the light beam, so that an optical path differing from the second optical path is formed.

Accordingly, the light beam which has been emerged from the first and second optical paths can be guided in a direction differing from that of the light beam made incident to the first and second optical paths and can avoid interference between the light beam emerged from the first and second optical paths and the light beam made incident to the first and second optical paths.

1-4. The scanning device is a micro-reflective member scanned in a two-dimensional direction.

If a reflection member scanned only in a one-dimensional direction is used as a scanning device which is scanned horizontally and a scanning device which is scanned vertically, a structure must be formed such that one reflective member is disposed at a position conjugated with the exit pupil, and another reflective member is disposed at a position (second pupil image surface) conjugated with the exit pupil. As a result, the optical system is enlarged. Additionally, since two slender reflective members are needed, the scanning device is enlarged. In contrast, if horizontal scanning and vertical scanning are performed by a two-dimensional scanning micro-reflective member which is a reflective member capable of scanning in a two-dimensional direction, a micro-device can be used as the scanning device, and scanning can be performed at high speed. Additionally, since all that is needed for the optical system is to have a conjugate relationship of one-time pupil image formation, the system can be reduced in size.

2. The scanning optical system comprises a scanning device which scans light from a light source and a first optical system which allows the light scanned by the scanning device to proceed to an exit pupil. The first optical system has a first surface, which has at least a reflective action and is decentered with respect to a central principal ray, and a second surface, which again reflects the central principal ray reflected by the first surface toward the first surface. The first surface reflects the central principal ray, which has again been made incident to the first surface from the second surface, toward a side substantially opposite to a side toward which the central principal ray was reflected the last time with respect to a normal on a hit point of the central principal ray on the first surface. The second surface has a diffusing, reflective action, and an intermediate image surface is formed on the second surface or in the vicinity of this.

In other words, the first optical system includes a case in which an inner product between outer products for a plurality of reflections, each formed by a vector indicating an incident direction onto the first surface and a vector indicating a reflective direction therefrom is negative, and the second surface has a diffusing, reflective action, and an intermediate image is formed on the second surface or in the vicinity of this.

In an optical system having an intermediate image surface having a long optical path length, the optical system having the long optical path length is brought into a small optical system by causing the optical paths (first and second optical paths) to overlap each other, and a small-sized display optical system can be achieved. Additionally, by providing the intermediate image surface and the diffusing surface on the returning reflective surface between the first and second optical paths, an optical system which guides a narrow beam is constructed in the first optical path, and a diffusing optical system which can cover a wide exit pupil is constructed in the second optical system, thus achieving the coexistence of the size reduction of the optical system with the enlargement of the exit pupil.

2-2. The optical system has a transparent body which has at least three surfaces including a plurality of rotationally asymmetric reflective surfaces.

Since the optical system of the embodiment is a decentered optical system, decentration aberrations occur. However, the generated decentration aberrations can be canceled or reduced by providing the plurality of rotationally asymmetric reflective surfaces. Additionally, even if the aspect ratio in the horizontal and vertical directions by the scanning device is freely set, the aspect ratio of an enlarging display image can be set at a required value (e.g., 3:4 or 9:16) since the plurality of rotationally asymmetric reflective surfaces are provided, thus making it possible to raise the design freedom.

Preferably, the rotationally asymmetric surface preferably has a plane-symmetric shape which has a local generatrix section as a sole symmetric plane. The reason is that machining and manufacturing can be more easily performed than in a case in which a symmetric plane is not provided. Further, since a plurality of conventional components can be replaced with the single transparent body by using the transparent body which has at least three surfaces, assembly and adjustment can be facilitated.

2-3. The optical system has at least one internal-total-reflection surface and performs internal total reflection at least two times.

The internal total reflection is a phenomenon in which theoretically 100% of light is reflected when the light is made incident at an angle greater than a critical angle with respect to a normal of a surface during reflections in the transparent body. Therefore, since optical usability is higher than that in metal film reflection or that in dielectric film reflection, a loss in the quantity of light can be removed. If the internal-total-reflection surface is provided in the first and second optical paths, internal total reflection is performed at least two times, and therefore losses in the quantity of light over the entire optical system can be reduced.

3. The scanning optical system comprises a scanning device which scans light from a light source and a first optical system which allows the light scanned by the scanning device to proceed to an exit pupil. The first optical system has a plurality of rotationally asymmetric reflective surfaces which face each other and are decentered with respect to an optical path. The first optical system additionally has a diffuse-reflective surface which has a diffuse-reflection action. An intermediate image is formed on the diffuse-reflective surface or in the vicinity of this, and light is guided to the exit pupil by the light reflected by the diffuse-reflective surface so as to form an enlarged image.

The optical path can be constructed in zigzag form, and the optical system can be thinned by arranging the plurality of rotationally asymmetric reflective surfaces so as to face each other. Further, the simultaneous pursuit of a size reduction of the optical system with the enlargement of the exit pupil can be achieved by providing the diffuse-reflective surface in the vicinity of the intermediate image surface.

3-2. The first optical system has a plurality of shared surfaces shared between an optical path from the scanning device to an intermediate image surface and an optical path from the intermediate image surface to the enlarged image.

Accordingly, unnecessary optical surfaces can be decreased, and the optical system can be reduced in size. The optical system from the intermediate image surface to the enlarged image is an ocular optical system. The optical system from the light source to the intermediate image surface is a relay optical system. Generally, the relay optical system is required to have nearly twice as strong optical power (reciprocal of a focal length) as the ocular optical system. Therefore, preferably, any one (especially a surface in the vicinity of the intermediate image surface) of the surfaces of the ocular optical system and the relay optical system is shared between the two optical paths. Since a light beam can be folded by both the relay optical system and the ocular optical system if a plurality of shared surfaces are provided, the entire optical system can be thinned.

3-3. The plurality of shared surfaces are rotationally asymmetric reflective surfaces.

A rotationally asymmetric reflective surface as a relay system reduces decentration aberrations at the intermediate image surface. A rotationally asymmetric reflective surface as an ocular optical system reduces decentration aberrations at the ocular optical system.

3-4. The first optical system has a transparent body having at least three surfaces including a plurality of shared surfaces. A reflective surface having a diffusing action is independent of the transparent body.

The reflective surface having a diffusing action can be made independent of the transparent body by constructing the reflective surface as one member and can be exchanged with a diffusing member which has various diffusing characteristics. It is permissible to form an intermediate image in the vicinity of a reflective surface of the transparent body and give a diffusing action to the reflective surface so as to unify the transparent body and the diffusing member. Thereby, the number of constituent parts can be lessened, and adjustment will not be required between the diffusing member and the transparent body. Additionally, if the reflective surface is set as the aforementioned returning reflective surface, the optical system can be reduced in size.

4. The scanning optical system comprises a scanning device which scans light from a light source and a first optical system which allows the light scanned by the scanning device to proceed to an exit pupil. The first optical system has a plurality of surfaces including reflective surfaces. The reflective surface has a transmissive area, which allows the light from the scanning device to be made incident into the first optical system, formed inside a reflective area by which light from another surface is reflected. The transmissive area is smaller in area than the reflective area and is higher in optical transmittance than the reflective area.

What is generally regarded as an optical-path separating member which transmits light from the scanning device and then reflects the light which has returned from another surface is a half mirror. However, when light which has passed through the half mirror returns and is reflected by the half mirror, the quantity of light is reduced fundamentally to ¼(25%), which indicates that usability of light is low.

Therefore, in the present embodiment, a reflective surface which has the aforementioned reflective area and transmissive area is used as an optical-path separating member. A very small area is merely required for a part through which light (beam) passes in an incident part of the first optical system to which light from the scanning device is made incident. Therefore, use is made of a reflective surface in which only the small part is used as a transmissive area without being used as a reflective area (a metal film is not applied only to the small area). Since a light beam has been diffused by the diffusing plate or the like when the light beam returns to this reflective surface, most of the light except the light beam which passes through the small transmissive area is reflected. Therefore, since the transmissive area is minute, an enlarged image is observed without allowing an observer to perceive a substantial fall in the quantity of light, and higher usability of light can be obtained than in a case in which a half mirror is used.

Herein, preferably, the ratio (Db/Da) of an area Db of the transmissive area to an area Da of a reflective area (effective area to which a light beam is made incident) in the aforementioned reflective surface is 10% or less. When this value is 10%, 100% of a light beam from the scanning device passes through the transmissive area and is made incident to the first optical system, and 90% of the light beam which has returned is reflected by the reflective surface if surface reflection, light absorption by a reflective film, etc., are not considered. Therefore, usability of light is 90%. When the ratio Db/Da exceeds 10%, a part of the light beam which has returned and which passes through the minute transmissive area (i.e., area which is not reflected) becomes relatively large, and, undesirably, unnecessary contrasting occurs in the observed enlarged image.

When the ratio Db/Da is 5% or less (i.e., usability of light is 90% or more), a fall in the quantity of light caused by the transmissive area is almost never perceived.

Although the shape of the transmissive area is preferably a circle or an ellipse, a quadrangle is acceptable. Preferably, the position of the transmissive area is in the reflective area and is set so that the entire reflective surface including the transmissive area and the reflective area becomes symmetric in rightward and leftward directions or in upward and downward directions. Accordingly, location accuracy can be easily obtained when the transmissive area is formed.

Figure 7A:
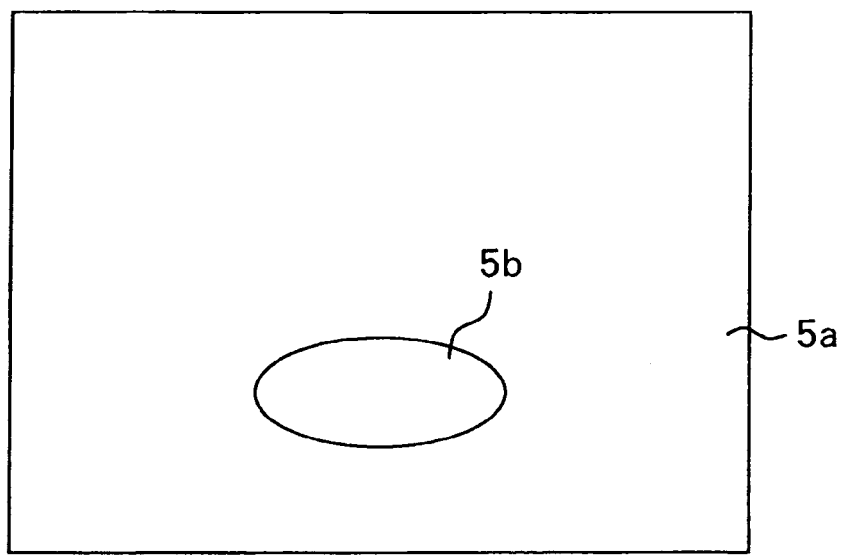
FIG. 7A and FIG. 7B are views showing transmission areas formed on the reflective surface in the scanning optical system of each embodiment.
Figure 7B:
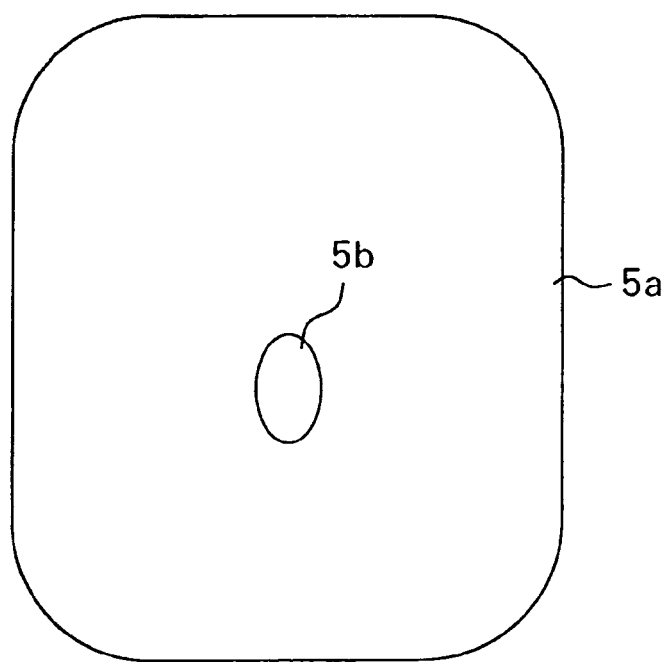

FIG. 7A shows a case in which the ratio Db/Da in the aforementioned reflective surface is 10% and FIG. 7B shows a case in which the ratio Db/Da is 5% (where 5$a$ designates the reflective area, and 5$b$ designates the transmissive area).

In a head-mounted display, since a position where an enlarged image is formed is apart from the eye of an observer (e.g., 50 cm to ∞) and since the position of the transmissive area 5$b$ is close to the eye of the observer, the eye of the observer observing the enlarged image is not focused on the transmissive area. Additionally, since the transmissive area is very small, the existence of the transmissive area is almost never perceivable.

Concerning the vicinity of the boundary between the transmissive area and the reflective area, transmittance gradually falls toward the reflective area, and the boundary can be made further imperceivable by executing a process by which the reflectance rises.

4-2. The optical system forms an intermediate image in the vicinity of the reflective surface which has a diffusing action (i.e., at the position of the reflective surface or a position close to this).

Accordingly, even when light reaches the intermediate image surface in the form of a narrow beam, the exit pupil can be enlarged, and observations can be easily made. Additionally, the area Da of the reflective area in the reflective surface having the transmissive area can be increased with respect to the area Db of the transmissive area (i.e., the ratio Db/Da can be lowered), and usability of light can be increased.

4-3. A conjugate image of the exit pupil of the optical system is formed on the transmissive area of the reflective surface or at a position in close vicinity to this.

Accordingly, the area Db of the transmissive area can be reduced (i.e., the ratio Db/Da can be lowered), and a fall in the quantity of light caused by the transmissive area can be controlled. Specifically, it is preferable to set the distance from the transmissive area to the conjugate image of the exit pupil at 10 mm or less.

Others. Further, in a plurality of rotationally asymmetric reflective surfaces, the absolute value of a focal length in the local generatrix section is larger than the absolute value of the focal length in a local directrix section.

Since the local generatrix section is a decentered section, the occurrence of decentration aberrations is greater than that in the local directrix section. Therefore, if a power arrangement is formed such that optical power on the local generatrix section of a plurality of surfaces is made weaker than optical power on the local directrix section, the occurrence of decentration aberrations on the local generatrix section can be decreased.

Additionally, if the aforementioned returning reflective surface is a curved surface, directions of light beams of a peripheral image can be individually controlled when reflected, in comparison with a case in which the returning reflective surface is a plane surface. Therefore, the optical system can be reduced in size.

Further, if the returning reflective surface is a rotationally asymmetric surface, directions of light beams of a peripheral image can be freely controlled, and therefore the optical system can be made more smaller than in a rotationally symmetric curved surface.

Preferably, losses in the quantity of light are reduced as much as possible by applying a metallic-mirror coating, by which almost 100% of light is reflected, onto the returning reflective surface. The returning reflective surface may be provided as a member independent of the transparent body having a plurality of surfaces or may be provided integrally with the transparent body.

The returning reflective surface reflects a light beam substantially toward the opposite side, and an angle θ between incident light and reflected light of the central principal ray should satisfy the following relationship.

$$|\theta|<60° \quad (1)$$

If the upper limit of conditional expression (1) is exceeded, an optical path (second optical path) after the returning reflection does not return on the first optical path, and a zigzag path rather than a to-and-fro (reciprocating) path is formed, thus making the optical system large.

More preferably, the abovementioned θ satisfies the following relationship.

$$|\theta|<30° \quad (2)$$

If the condition of conditional expression (2) is not met, the first and second optical paths do not sufficiently overlap each other although the light beam can return. Therefore, the optical system is enlarged, and difficulty arises in achieving the size reduction of the entire scanning optical system.

Even more preferably, the abovementioned θ satisfies the following relationship.

$$|\theta|<20° \quad (3)$$

If conditional expression (3) is satisfied, the optical system and the entire scanning optical system can be sufficiently reduced in size.

In the optical system, the returning reflective surface and the decentered reflective surface through which the forward route and the return route pass may be used in common. Whereby, the number of optical surfaces can be reduced, and the optical system can be reduced in size.

If the scanning optical system of the present embodiment is applied to a head-mounted display (HMD), it is recommended to provide respective independent scanning devices and optical systems for the right and left eyes of an observer. In other words, it is recommended to provide the same two scanning devices and the same two optical systems matching the scanning devices. Accordingly, a brighter image can be displayed than in a case in which light is divided from a single scanning device to right and left optical systems.

Additionally, in the scanning optical system, it is recommended to dispose a local generatrix section which is a decentered section for the left eye and for the right eye in upward and downward directions of the face of the observer (i.e., a light beam is folded in upward and downward directions). Normally, an enlarged displayed image has a wide field angle in rightward and leftward directions and has a narrow field angle in upward and downward directions (e.g., rightward/leftward 4: upward/downward 3). Therefore, it is possible to reduce the occurrence of decentration aberrations in the enlarged displayed image by setting the local generatrix section, which is a decentered section and is large in the occurrence of decentration aberrations, to extend in upward and downward directions having a small field angle.

In the present invention, it is preferable to satisfy the following conditional expression, wherein local-fy1 is a local-generatrix-section focal length of an ocular optical system from an intermediate image surface described later to an exit pupil, and local-fy2 is a local-generatrix-section focal length from a two-dimensional scanning member to the intermediate image surface.

$$-2 < \text{local-fy1}/\text{local-fy2} < 1$$

If the length is below the lower limit of this expression, negative optical power from the two-dimensional scanning member to the intermediate image surface is strengthened, and, in order to form an intermediate image, positive optical power of a collimator optical system is required to be strengthened, and the occurrence of aberrations in the collimator optical system is increased.

On the other hand, if the upper limit thereof is exceeded, positive optical power from the two-dimensional scanning member to the intermediate image surface is strengthened, and an optical swing angle of the two-dimensional scanning member is narrowed, thus making widening of the field angle difficult.

A description will be hereinafter given of concrete embodiments together with their Numerical Examples.

Embodiment 1

Figure 2:
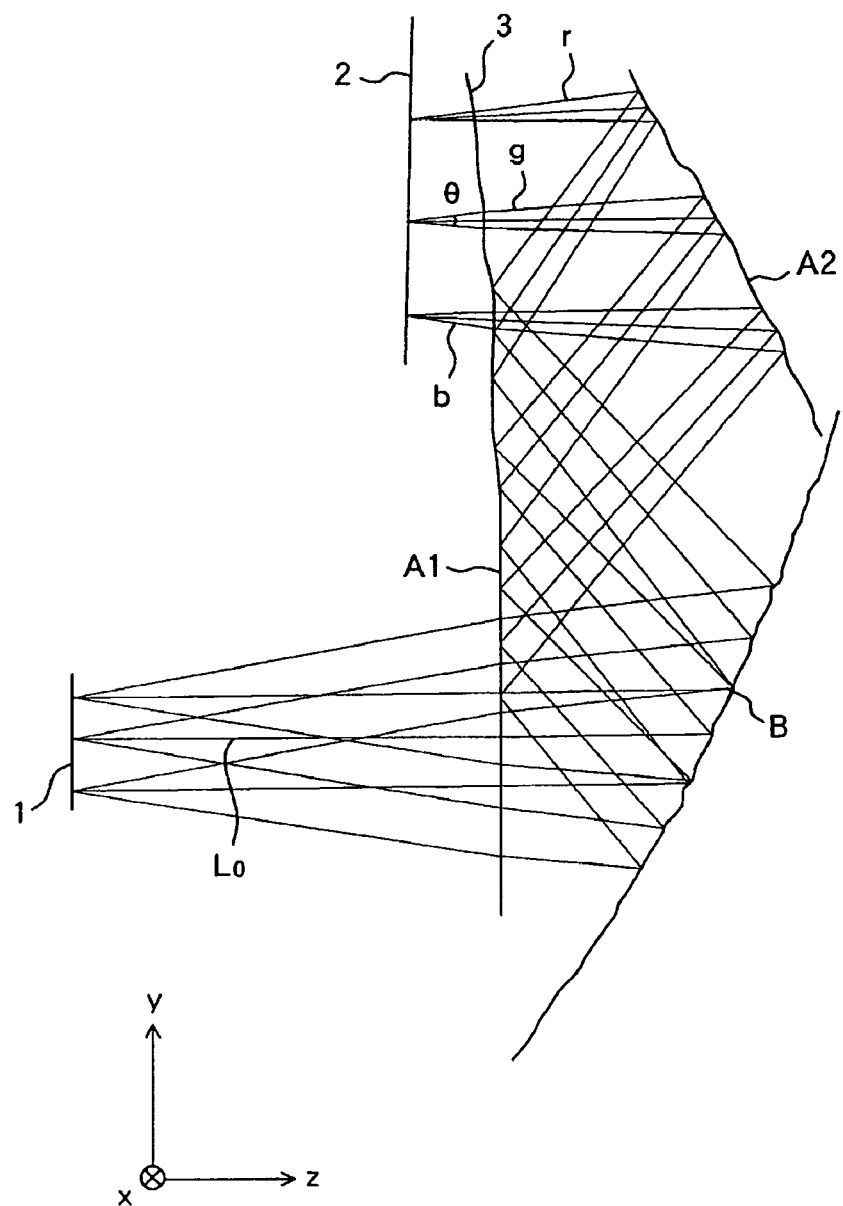
FIG. 2 is a view showing beam paths obtained after performing diffuse reflections in the scanning optical system of Embodiment 1.

FIG. 1 is a cross-sectional view of beam paths from a light source 8 to an exit pupil 1 of a scanning optical system which is Embodiment 1 of the present invention. FIG. 2 is a view of diffused reflected light from a diffuse-reflective surface 2 which is an intermediate image surface. The scanning optical system is to be used in an image display apparatus, such as a head-mounted display (HMD) or a projector which projects an image onto a screen.

A light source 8 is shown as a single light source in the drawing, however, in actuality the light source 8 is made up of LEDs of three colors, i.e., red (r), green (g), and blue (b) (instead, laser diodes or the like may be used) The three color LEDs are disposed at optically equivalent positions through, for example, a dichroic prism which performs color combination. The three color LEDs can change (i.e., modulate) their intensities.

A drive circuit 10 which drives the light source 8 (three color LEDs) is connected to the light source 8. Image information is input to the drive circuit 10 from an image-information supply apparatus 12, such as a personal computer, a DVD player, a video, or a TV tuner. The drive circuit 10 controllably modulates the light source 8 in accordance with the image information input from the image-information supply apparatus 12 (the same applies to the other embodiments described later although these are not shown in the drawings). The image display apparatus and the image-information supply apparatus 12 of this embodiment constitute an image display system.

Light from the light source 8 is changed into substantially parallel light (beam) by a collimator lens 7 and is reflected by a two-dimensional scanning micro-mirror 4. The two-dimensional scanning mirror 4 used in this embodiment is an extremely small mirror with a maximum effective dimension of 3 mm or less (the same applies to the other embodiments described later).

A micro-device, such as a MEMS (Micro-Electro Mechanical System) is used as the scanning mirror 4, and a mirror surface can be scanned and driven in a two-dimensional direction. The scanning mirror 4 is driven by the drive circuit 10 in accordance with a vertical synchronizing signal transmitted from the image-information supply apparatus 12.

By the drive of the scanning mirror 4, a light beam reflected by the scanning mirror 4 are deflectively scanned in the horizontal and vertical directions simultaneously, and light the beam forms a field angle. The light beam passes through a correcting prism 6 and is made incident to a reciprocating prism 3.

Herein, the boundary plane of the correcting prism 6 and that of the reciprocating prism 3 have substantially the same surface shape, and the correcting prism 6 and the reciprocating prism 3 are disposed with an extremely thin air layer therebetween. However, the correcting prism 6 and the reciprocating prism 3 may be joined together without an air layer.

The reciprocating prism 3 has three optical surfaces and is a transparent body whose interior is filled with an optical medium, such as glass or plastic. A surface A1 is an internal-total-reflection surface which has a reflective action and a transmissive action. A surface B is a reflective surface which has a minute transmissive area (pinhole) 5b in a reflective area 5a as shown in FIG. 7A and FIG. 7B. A surface A2 is a reflective surface. Reference Numeral 2 designates a diffuse-reflective surface provided as a member independent of the reciprocating prism 3, which is a returning reflective surface which has a diffusing action.

A reflective film is formed on the surface A2 and on the diffuse-reflective surface 2. A reflective film is formed on a part (reflective area 5a) of the surface B other than the minute transmissive area 5b. Preferably, the reflective film is made of a metal film. The reason is that the metal film is flat in spectral reflectance characteristics and has an unobtrusive color and that the metal film is small in the difference of reflectance with respect to light having different polarizing directions.

In this embodiment, the surface B functions as an incident surface and as a reflective surface. The surface A1 functions as an emergent surface through which light proceeding to the diffuse-reflective surface 2 emerges, as an emergent surface through which light proceeding to an exit pupil 1 emerges, as an incident surface of light from the diffuse-reflective surface 2, and as a reflective surface shared in the to-and-fro optical path. The surface A2 functions as a reflective surface shared in the to-and-fro optical path.

In this embodiment, all of the optical surfaces are rotationally symmetric surfaces.

The light beam made incident to the reciprocating prism 3 from the transmissive area 5b in the surface B is made incident to the surface A1 at an incident angle greater than its critical angle, then performs an internal total reflection, is then reflected by the surface A2, then is made incident to the surface A1 at an incident angle smaller than its critical angle, and is emerged from the reciprocating prism 3. The light beam emerged from the reciprocating prism 3 forms an intermediate image on the diffuse-reflective surface 2 or at a position close to (in the vicinity of) this, is then reflected and diffused by the diffuse-reflective surface 2, and forms a thick light beam having a small F-number (i.e., a bright light beam) as shown in FIG. 2.

The diffuse-reflective surface 2 is a returning reflective surface, and reflects the incident light beam so that the incident light beam returns in a direction substantially opposite to the incident direction. An angle between the incident light onto the returning reflective surface and the reflected light therefrom, which are portions of a central principal ray L0, is θ, that is mentioned above.

Thereafter, the light beam again is made incident to the reciprocating prism 3 from the surface A1, is then reflected by the surface A2 and the surface A1, is then reflected by the surface B toward the exit pupil 1 (toward an eyeball of an observer if a head-mounted display is used, and toward a screen if a projector is used), is then emerged from the surface A1 of the reciprocating prism 3, and reaches the exit pupil 1.

In the head-mounted display, an enlarged image can be observed by allowing the observer to place his/her eyes in the vicinity of the exit pupil 1.

In the reciprocating prism 3, light travels to each surface in the following order: surface B (transmission of the transmissive area 5b)→surface A1 (reflection)→surface A2 (reflection)→surface A1 (transmission)→diffuse-reflective surface 2 (returning reflection+diffusion)→surface A1 (re-transmission)→surface A2 (re-reflection)→surface A1 (re-reflection)→surface B (reflection by reflective area 5a)→surface A1 (transmission). With the reflection caused by the returning reflective surface as a turning point, the light follows the optical path, along which the light has traveled, in the opposite direction. A route from the surface B (transmission of transmissive area 5b) to the returning reflective surface is the first optical path, and a route from the returning reflective surface to the surface B (reflection) is the second optical path. A to-and-fro optical path is formed in which the first optical path and the second optical path almost exactly overlap each other.

Additionally, in Embodiment 1, a mechanical deflection angle of the micro-scanning mirror 4 is ±4.25°, and an optical deflection angle is ±8.5° on the local generatrix section (i.e., on the plane of the drawing sheet of FIG. 1 or FIG. 2). At this time, a light deflection width of ±10° (vertical), which is a field angle, is obtained on the exit pupil plane. Scanning is simultaneously performed in the horizontal direction.

FIG. 1 is a traced drawing of light beams where light beams are not diffused by the diffuse-reflective surface 2, in which the diameter of the exit pupil is φ1 mm. In the trace of diffused reflected light shown in FIG. 2, the diameter of the exit pupil is φ8 mm.

Embodiments 2 to 5

Figure 3:
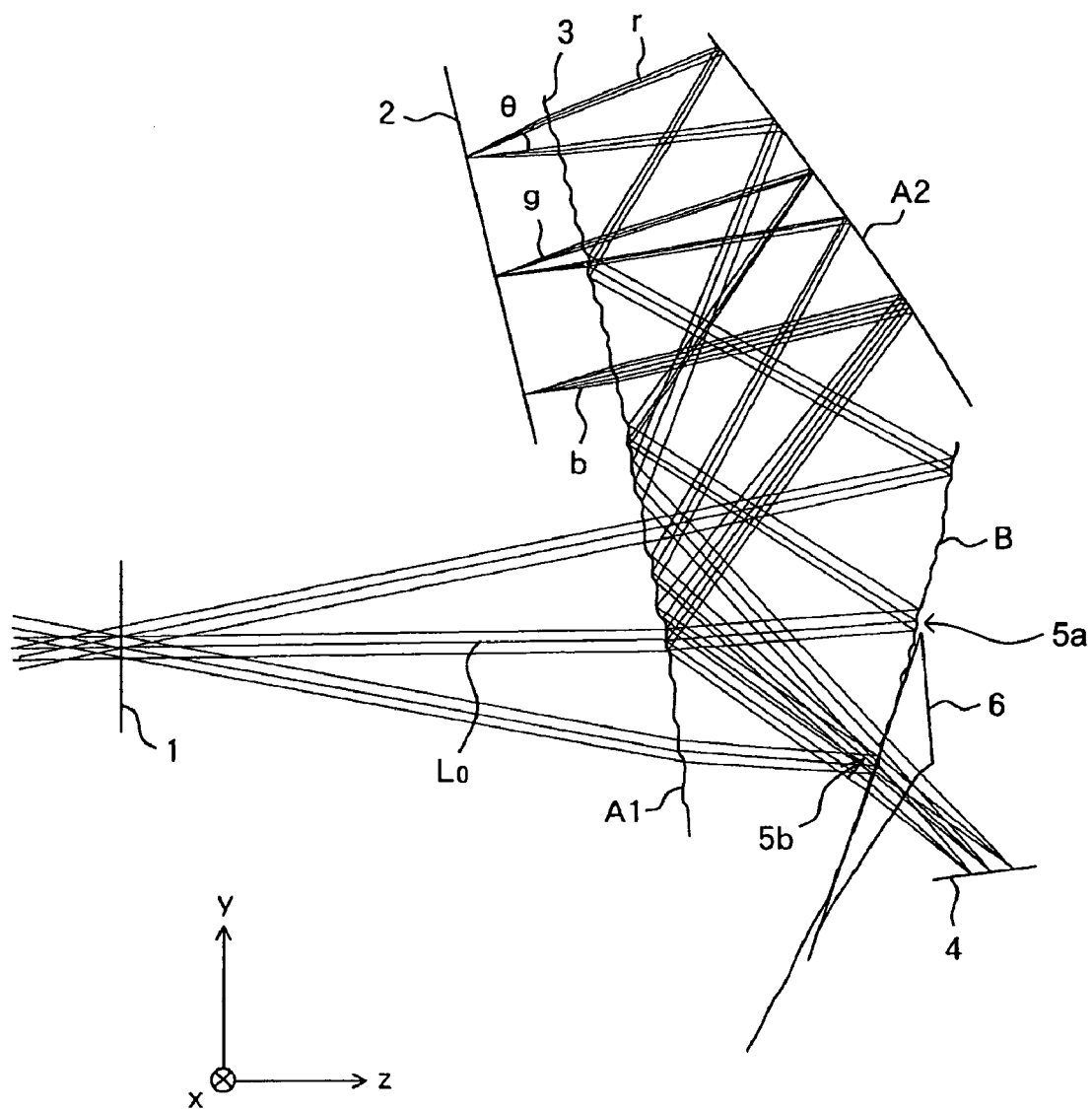
FIG. 3 is a view showing beam paths of the scanning optical system which is Embodiment 2 of the present invention.
Figure 4:
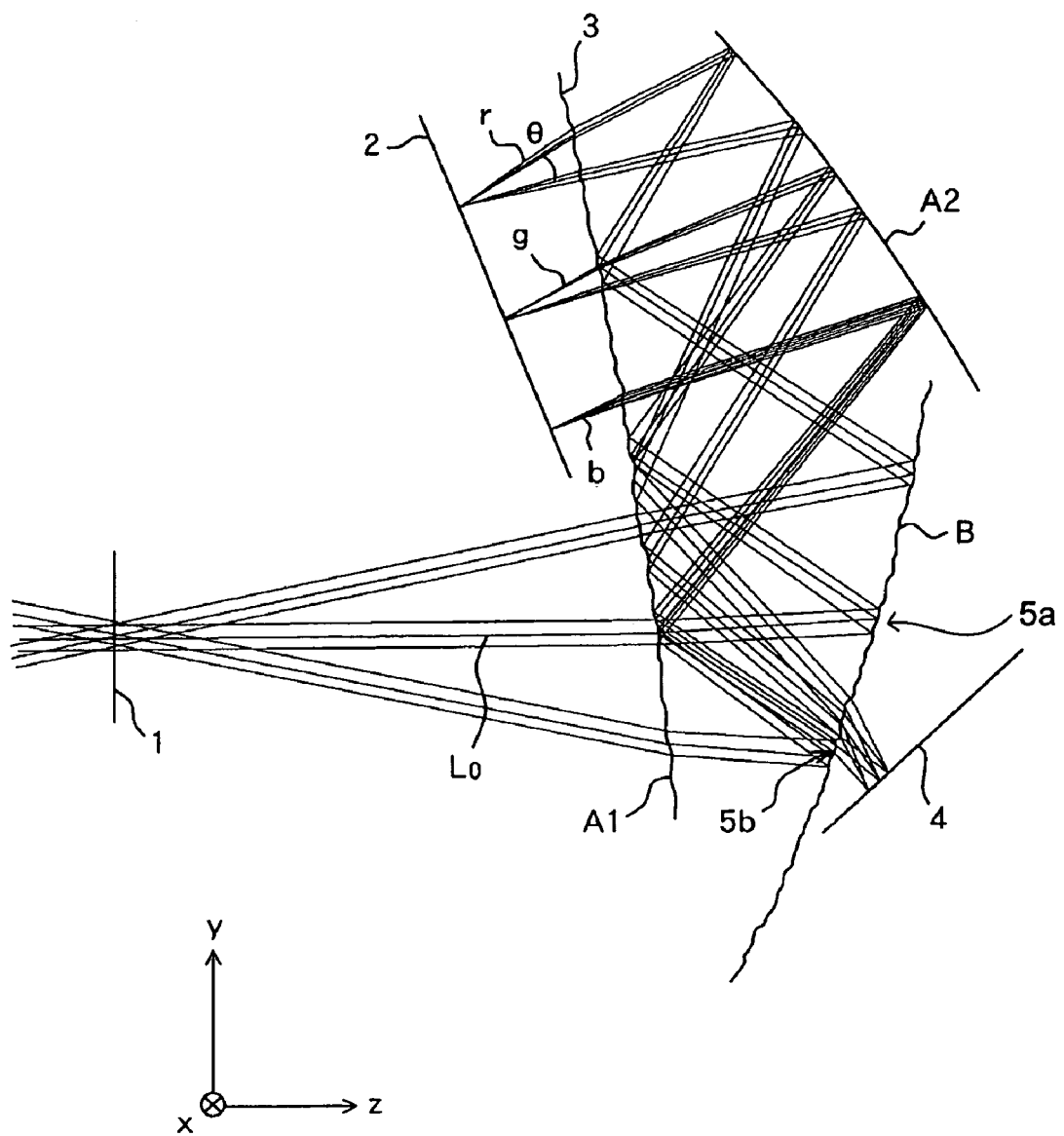
FIG. 4 is a view showing beam paths of the scanning optical system which is Embodiment 3 of the present invention.
Figure 5:
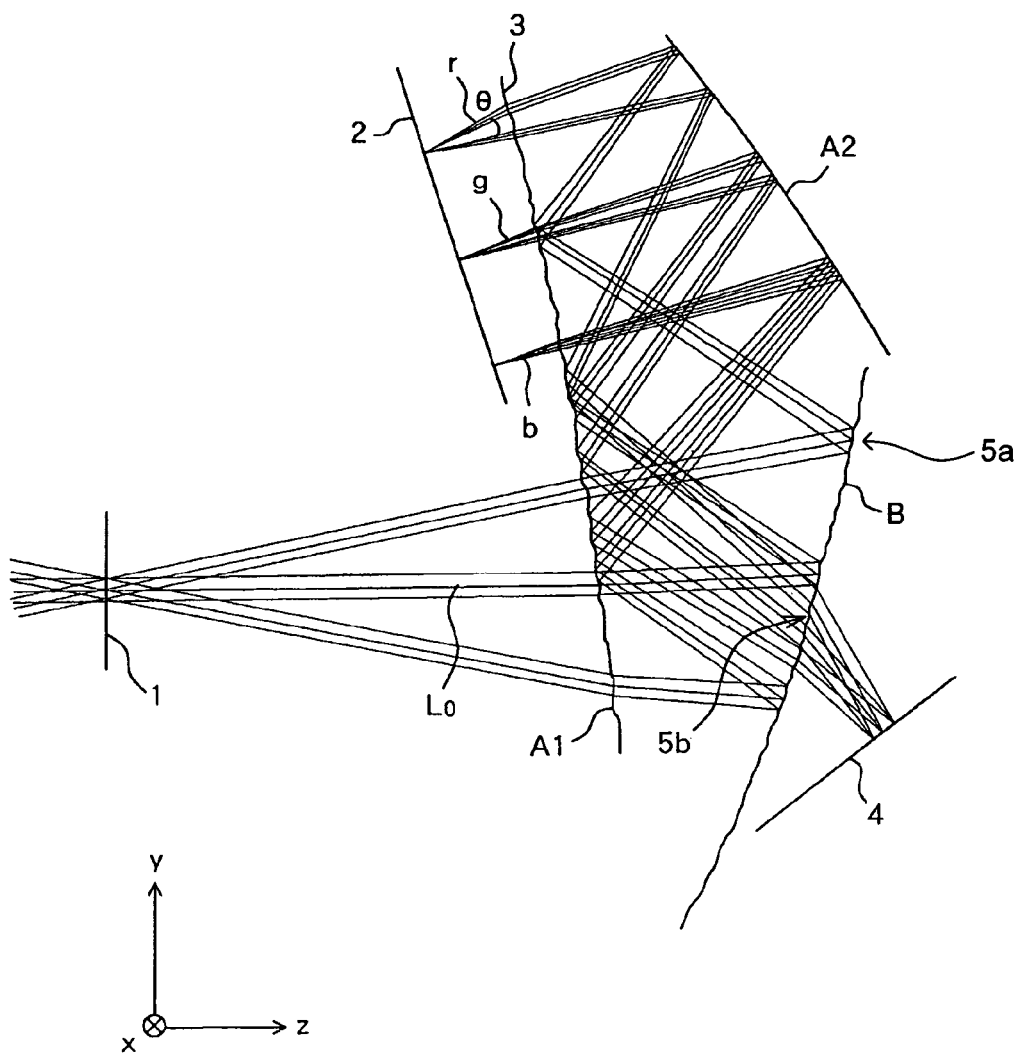
FIG. 5 is a view showing beam paths of the scanning optical system which is Embodiment 4 of the present invention.
Figure 6:
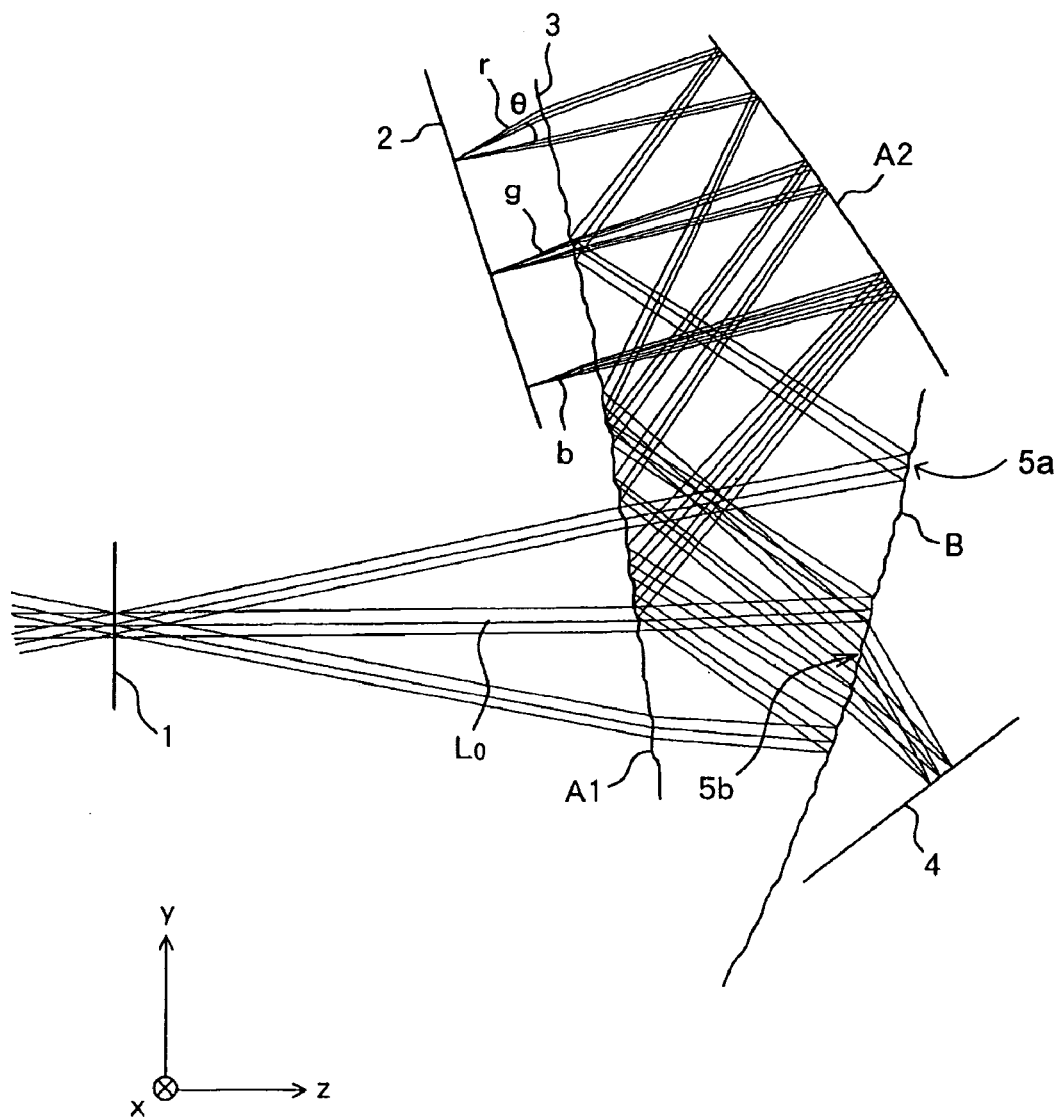
FIG. 6 is a view showing beam paths of the scanning optical system which is Embodiment 5 of the present invention.

FIG. 3 is a sectional view (beam traced drawing) of beam paths of the scanning optical system which is Embodiment 2 of the present invention, FIG. 4 is a sectional view of beam paths of the scanning optical system which is Embodiment 3 of the present invention, FIG. 5 is a sectional view of beam paths of the scanning optical system which is Embodiment 4 of the present invention, and FIG. 6 is a sectional view of beam paths of the scanning optical system which is Embodiment 5 of the present invention.

FIG. 3 through FIG. 6 are traced-drawings, each traced between the exit pupil 1 and the two-dimensional micro-scanning mirror 4, in which the collimator lens 7 and the light source 8 are omitted. A traced drawing of diffused, reflected light from the diffuse-reflective surface 2, which is an intermediate image surface, to the exit pupil 1 is also omitted.

In Embodiments 2 to 5, the field angle to the exit pupil 1 is the same. The horizontal field angle is ±15°, and the vertical field angle is ±11.3°.

The diameter of the exit pupil obtained when light is diffused and reflected by the diffuse-reflective surface 2 is also the same, i.e., φ8 mm. The diameter of the exit pupil in the beam traced drawings of FIG. 3 through FIG. 6 is φ1 mm to 1.3 mm, and the dimension of the transmissive area 5b on the reflective surface B at that time is φ2 mm to 5 mm.

Although the structure of Embodiment 2 and that of Embodiment 3 shown in FIG. 3 and FIG. 4, respectively, are basically the same as the structure of Embodiment 1, they differ from the structure of Embodiment 1 in the fact that free-form surfaces (rotationally asymmetric surfaces) are employed in all optical surfaces except the diffuse-reflective surface 2. Both sides of the correcting prism 6 are also free-form surfaces.

In Embodiment 2, the optical power of each surface is set so that the transmissive area 5b becomes smaller than in Embodiment 3. If a free-form surface is employed in the collimator lens 7, light from the light source can be efficiently gathered, which is not shown. An optical deflection angle is ±10.5° in the local directrix section (horizontal direction, perpendicular to the drawing sheet) of the micro-scanning mirror 4 in Embodiments 2 and 3.

The structure of Embodiment 4 shown in FIG. 5 and the structure of Embodiment 5 shown in FIG. 6 differ from the structures of Embodiments 1 to 3 (FIG. 1 through FIG. 4) in the fact that the correcting prism 6 is not provided.

In Embodiments 4 and 5, light from the micro-scanning mirror 4 is made incident directly into the reciprocating prism 3 through the transmissive area 5b in the reflective surface B of the reciprocating prism 3. The optical path to be followed after the light is made incident into the reciprocating prism 3 is the same as in Embodiments 1 to 3.

In Embodiments 4 and 5, a free-form surface is employed in all optical surfaces except the diffuse-reflective surface 2.

In Embodiment 4, the optical power of each surface is set so that the transmissive area 5b is smaller than in Embodiment 5. The optical deflection angle in the local directrix section of the micro-scanning mirror 4 (horizontal direction, perpendicular to the plane of the drawing sheet) is ±14° in Embodiment 4, and is ±13° in Embodiment 5.

The field angle in the local directrix section of the exit pupil plane in Embodiments 2 to 5 is ±15°. As can be understood from FIG. 3 through FIG. 4, it is recommended to give negative optical power to an optical surface on which light is made incident to immediately after being reflected by the micro-scanning mirror 4 (a scanning-mirror-side surface of the correcting prism 6 in Embodiments 2 and 3). Whereby, a wide field angle can be easily obtained, because both angles are increased by this negative optical power regardless of the fact that the optical deflection angle of the micro-scanning mirror 4 is small.

If the reflection by surface A1 is an internal total reflection, which is common to Embodiments 1 to 5, a loss in the quantity of light will be desirably lessened. Almost the same brightness can be secured while increasing the design freedom when the reflection performed in areas (a lower part of the surface A1 from which a light beam proceeding to the exit pupil 1 is emerged and an upper part of the surface A1 from which a light beam proceeding to the diffuse-reflective surface 2 is emerged) which are shared between reflected light and emerged light at least in the surface A1 is an internal total reflection, and when the reflection performed in areas other than the shared areas is a reflection by a reflective film made of, for example, a metal film, compared to a case in which all of the reflected light reflected by the surface A1 undergoes an internal total reflection.

Since there is a fear that an observer will clearly see the boundary (edge) of the reflective film in the vicinity of the boundary between the area of the reflective film and the shared area, it is preferable to form the vicinity of the boundary (i.e., at lower and upper parts in the area of the reflective film) so as to make the boundary unobtrusive by gradually raising reflectance correspondingly with retreat from the shared area.

(Numerical Examples) Numerical Examples of the aforementioned embodiments will be shown hereinafter. A local-paraxial axis is used in each Numerical Example. This will be described first.

FIG. 1 through FIG. 6 are sectional views, each showing a main part of each embodiment described above (local generatrix sectional views; the suffix is y). The surface vertex coordinate system of a first surface (exit pupil 1) is shown in FIG. 1. In each embodiment, the surface vertex of each surface is Shift-decentered only in the y-axial direction and tilt-decentered around the x axis, and therefore a conventional generatrix section and the local generatrix section are the same, but a conventional directrix section and the local directrix section of each surface are different. The conventional generatrix section and directrix section mentioned above are defined by a general-paraxial axis. The local generatrix section and local directrix section are defined by a local-paraxial axis described hereinafter. A description will also be given of the definitions of a local curvature radius, a local surface-to-surface distance, a local focal length, and a local refractive power, which correspond to a decentered system, in the local-paraxial axis.

In each embodiment, a ray which is emitted from the light source 8 and which passes through the center of an enlarged image and through the center of the exit pupil 1 of the optical system is defined as a reference ray (central principal ray), and a local curvature radius, local surface-to-surface distance, local focal length, and local refractive power based on a hit point (incident point) on each surface of the reference ray are used, without using a conventional curvature radius, surface-to-surface distance, focal length, and refractive power based on the surface vertex of each surface.

Herein, the local curvature radius denotes a local curvature radius on a hit point of an optical surface (curvature radius on a local generatrix section, curvature radius on a local directrix section). The local surface-to-surface distance denotes a distance between two hit points on the current surface and the following surface (value on the reference ray, without air conversion). The local focal length is a value obtained by a calculation according to a conventional focal-length computational method (paraxial tracing) from a local curvature radius, refractive index before and behind the surface, and a local surface-to-surface distance. The local refractive power (optical power) is a reciprocal of the local focal length.

Each Numerical Example shows a conventional curvature radius, a conventional surface-to-surface distance, a conventional decentration amount, a conventional refractive index, and a conventional Abbe number, and, in addition, a local curvature radius, a surface refractive index, a local surface-to-surface distance, and a local focal length.

Data of Numerical Examples which correspond to the aforementioned five embodiments are shown in Table 1 (Numerical Example 1), Tables 2 and 3 (Numerical Example 2), Tables 4 and 5 (Numerical Example 3), Tables 6 and 7 (Numerical Example 4), and Tables 8 and 9 (Numerical Example 5). The sectional views of optical paths are shown in FIG. 1 through FIG. 6. In the general-paraxial axis in Tables 1 to 9, there are shown a generatrix section curvature radius ry, a directrix section curvature radius rx, a surface-to-surface distance d (distance parallel to the surface vertex coordinate system of the first surface), a decentration amount (on a generatrix section, a parallel decentration amount of the surface vertex of each surface with respect to the surface vertex coordinate system of the first surface is represented as "shift," and a tilt decentration amount (degree) is represented as "tilt"), a refractive index nd of a d line, and an Abbe number vd. FFS designates a free-form surface (rotationally asymmetric surface). A surface where "M" is given to the left end of each table is a reflective surface, and a surface where "M(dif)" is given is a diffuse-reflective surface. The refractive index nd of the d line uses an inverse sign. Tables 1 to 9 are numerical data obtained when an optical path is oppositely traced from the exit pupil 1 toward the scanning mirror 4 and the light source 8.

The definitional equation of FFS (free-form surface) is shown below. The following equation is a definitional equation in the surface vertex coordinate system of each surface.

$$Z = \frac{(x^2 + y^2)/r}{1 + SQRT(1 - (1 + c1)(x^2 + y^2)/r^2)} +$$

$$c5(x^2 - y^2) +$$

$$c6(2x^2 + 2y^2 - 1) +$$

$$c10(3x^2 y + 3y^3 - 2y) +$$

$$c11(3x^2 y - y^3) +$$

$$c12(x^4 - 6x^2 y^2 + y^4)$$

$$c13(4x^4 - 4y^4 - 3x^2 + 3y^2) +$$

$$c14(6x^4 + 12x^2 y^2 + 6y^4 - 6x^2 - 6y^2 + 1) +$$

$$c20(10yx^4 + 20x^2 y^3 + 10y^5 - 12x^2 y - 12y^3 + 3y) +$$

$$c21(15yx^4 + 10x^2 y^3 - 5y^5 - 12x^2 y + 4y^3) +$$

$$c22(5yx^4 - 10x^2 y^3 + y^5) +$$

$$c23(x^6 - 15x^4 y^2 + 15x^2 y^4 - y^6) +$$

$$c24(6x^6 - 30x^4 y^2 - 30x^2 y^4 + 6y^6 - 5x^4 + 30x^2 y^2 - 5y^4) +$$

$$c25(15x^6 + 15x^4 y^2 - 15x^2 y^4 - 15y^6 - 20x^4 + 20y^4 + 6x^2 - 6y^2) +$$

$$c26(20x^6 + 60x^4 y^2 + 60x^2 y^4 + 20y^6 - 30x^4 - 60x^2 y^2 - 30y^4 +$$

$$12x^2 + 12y^2 - 1)$$

In the aforementioned definitional equation, C1, C5, . . . are free-form surface coefficients. In this free-form surface, since coefficients participating in a paraxial axis exist in the free-form surface coefficients, the values of a generatrix section curvature radius ry and directrix section curvature radius rx of a general-paraxial axis are not equal to those of an actual generatrix section curvature radius ry and directrix section curvature radius rx on a surface vertex. Therefore, point (0,0), i.e., the actual generatrix section curvature radius ry and directrix section curvature radius rx on the surface vertex are also shown.

In the local-paraxial axis, there are shown a local curvature radius (local-ry, local-rx), a local surface-to-surface distance (local-d) (a reflective surface has an inverse sign), a local focal length (local-fy, local-fx), and a surface refractive index nd (a reflective surface has an inverse sign). There are additionally shown hit point coordinates on each surface (in which a surface vertex is represented as (0,0)) and field angles 2ωy and 2ωx on the exit pupil (a full field angle in total on the +side and the −side; ω is a half field angle).

In Table 1 (Numerical Example 1), only the general-paraxial axis is shown since all surfaces used here are rotationally-symmetric surfaces (the actual generatrix section curvature radius ry and directrix section curvature radius rx on the surface vertex are omitted).

An 18th surface of Table 1 is a two-dimensional scanning mirror. ZOOM1 is surface data obtained when a field angle ωy on the local generatrix section to the exit pupil and a field angle ωx on the local directrix section are both 0°. ZOOM2 is surface data obtained when a field angle ωy on the local generatrix section to the exit pupil is ±10°. ZOOM3 is surface data obtained when a field angle ωy on the local generatrix section to the exit pupil is −10°.

There are additionally shown local focal lengths local-fy1, local-fx1 of an ocular optical system (3rd to 7th surfaces) and local focal lengths local-fy2, local-fx2 from a two-dimensional scanning mirror to an intermediate image surface (10th to 14th surfaces of Table 1, 11th to 16th surfaces of Tables 2 to 5, and 11th to 14th surfaces of Tables 6 to 9). In Table 1, a relay-system local focal length (10th to 21st surfaces) from a light source to an intermediate image surface is also shown.

NUMERICAL EXAMPLE 1

TABLE 1

(general - paraxial axis)

|   | n | ry | rx | d | shift | tilt | nd | vd |
|---|---|---|---|---|---|---|---|---|
|   | 1 | 0.00000 | 0.00000 | 0.000 | 0.000 | 0.000 | 1.000 | |
|   | 2 | 0.00000 | 0.00000 | 20.000 | 0.000 | 0.000 | 1.000 | |
|   | 3 | −410.36750 | −410.36750 | 10.000 | 0.000 | 0.000 | 1.571 | 33.79 |
| M | 4 | −99.07531 | −99.07531 | −10.000 | 0.000 | −25.000 | −1.571 | 33.79 |
| M | 5 | −410.36750 | −410.36750 | 13.000 | 0.000 | 0.000 | 1.571 | 33.79 |
| M | 6 | −130.27460 | −130.27460 | −13.000 | 20.000 | 24.000 | −1.571 | 33.79 |
|   | 7 | −410.36750 | −410.36750 | 0.000 | 0.000 | 0.000 | −1.000 | |
|   | 8 | 0.00000 | 0.00000 | −4.545 | 20.000 | −1.362 | −1.000 | |
| M(dif) | 9 | 0.00000 | 0.00000 | 4.545 | 20.108 | −1.362 | 1.000 | |
|   | 10 | −410.36750 | −410.36750 | 13.000 | 0.000 | 0.000 | 1.571 | 33.79 |
| M | 11 | −130.27460 | −130.27460 | −13.000 | 20.000 | 24.000 | −1.571 | 33.79 |
| M | 12 | −410.36750 | −410.36750 | 10.000 | 0.000 | 0.000 | 1.571 | 33.79 |
|   | 13 | −99.07531 | −99.07531 | 0.091 | 0.000 | −25.000 | 1.000 | |
|   | 14 | −99.07531 | −99.07531 | 2.719 | −0.042 | −25.000 | 1.571 | 33.79 |
|   | 15 | 0.00000 | 0.00000 | 1.928 | −1.310 | −50.000 | 1.000 | |
|   | 16 | 0.00000 | 0.00000 | −1.462 | −3.608 | −50.000 | 1.000 | |
|   | 17 | 0.00000 | 0.00000 | 0.000 | −4.835 | −61.000 | 1.000 | |
| ZOOM1: (ωy, ωx) = (0 deg, 0 deg) | | | | | | | | |
| M | 18 | 0.00000 | 0.00000 | 0.000 | −4.835 | 4.000 | −1.000 | |
| ZOOM2: (ωy, ωx) = (10 deg, 0 deg) | | | | | | | | |
| M | 18 | 0.00000 | 0.00000 | 0.000 | −4.835 | 0.000 | −1.000 | |
| ZOOM3: (ωy, ωx) = (−10 deg, 0 deg) | | | | | | | | |
| M | 18 | 0.00000 | 0.00000 | 0.000 | −4.835 | 8.500 | −1.000 | |
|   | 19 | 0.00000 | 0.00000 | −2.489 | −4.835 | 59.000 | −1.000 | |
|   | 20 | −4.00000 | −4.00000 | −1.030 | −8.006 | 59.000 | −1.517 | 64.16 |
|   | 21 | 6.00000 | 6.00000 | −2.457 | −9.721 | 59.000 | −1.000 | |
|   | 22 | 0.00000 | 0.00000 | 0.000 | −13.810 | 59.000 | −1.000 | | local-fy1 (3-7)  local-fx1 (3-7)
28.422  28.413
local-fy2 (10-14)  local-fx2 (10-14)
58.198  58.099
local-fy (10-21)  local-fx (10-21)
10.402  10.418

NUMERICAL EXAMPLE 2

TABLE 2

(general - paraxial axis)

|   | n | ry | rx | d | shift | tilt | nd | vd |
|---|---|---|---|---|---|---|---|---|
|   | 1 | 0.00000 | 0.00000 | 0.000 | 0.000 | 0.000 | 1.000 | |
|   | 2 | 0.00000 | 0.00000 | 30.890 | 0.000 | 0.000 | 1.000 | |
| FFS | 3 | −225.33678 | −225.33678 | 11.979 | −1.403 | 8.066 | 1.571 | 33.79 |
| FFS-M | 4 | −99.04891 | −99.04891 | −11.979 | −5.905 | −18.752 | −1.571 | 33.79 |
| FFS-M | 5 | −225.33678 | −225.33678 | 13.542 | −1.403 | 8.066 | 1.571 | 33.79 |
| FFS-M | 6 | −141.31928 | −141.31928 | −13.542 | 18.380 | 32.717 | −1.571 | 33.79 |
| FFS | 7 | −225.33678 | −225.33678 | −2.618 | −1.403 | 8.066 | −1.000 | |
|   | 8 | 0.00000 | 0.00000 | −5.357 | 17.071 | 14.118 | −1.000 | |
|   | 9 | 0.00000 | 0.00000 | 0.000 | 15.724 | 14.118 | −1.000 | |

TABLE 2-continued

|      | n  | ry | rx | d | Y | Z | nd | θ |
|------|----|----|----|----|----|----|----|----|
| M(dif) | 10 | 0.00000 | 0.00000 | 7.976 | 15.724 | 14.118 | 1.000 | |
| FFS | 11 | −225.33678 | −225.33678 | 13.542 | −1.403 | 8.066 | 1.571 | 33.79 |
| FFS-M | 12 | −141.31928 | −141.31928 | −13.542 | 18.380 | 32.717 | −1.571 | 33.79 |
| FFS-M | 13 | −225.33678 | −225.33678 | 11.979 | −1.403 | 8.066 | 1.571 | 33.79 |
| FFS | 14 | −99.04891 | −99.04891 | 0.095 | −5.905 | −18.752 | 1.000 | |
| FFS | 15 | −99.04891 | −99.04891 | −0.616 | −5.937 | −18.752 | 1.571 | 33.79 |
| FFS | 16 | 40.57191 | 40.57191 | 4.560 | −11.071 | −27.728 | 1.000 | |
|      | 17 | 0.00000 | 0.00000 | 0.000 | −11.208 | −67.728 | 1.000 | |
|      | 18 | 0.00000 | 0.00000 | 0.000 | −11.208 | −67.728 | 1.000 | |

| | | | | | | |
|---|---|---|---|---|---|---|
| FFS | 3 | $c1 = 7.5855e-001$ | $c5 = -2.3887e-005$ | $c6 = 2.5447e-006$ | $c10 = 7.4881e-008$ | $c11 = -5.1152e-007$ |
|     |   | $c12 = 1.0881e-008$ | $c13 = 1.9077e-009$ | $c14 = -6.0163e-010$ | $c20 = 0.0000e+000$ | $c21 = 0.0000e+000$ |
| FFS | 4 | $c1 = -1.3863e-001$ | $c5 = 2.7102e-005$ | $c6 = -1.4935e-005$ | $c10 = -6.0669e-008$ | $c11 = -1.0467e-007$ |
|     |   | $c12 = 8.8540e-009$ | $c13 = -1.9879e-008$ | $c14 = 1.5218e-009$ | $c20 = 0.0000e+000$ | $c21 = 0.0000e+000$ |
| FFS | 5 | $c1 = 7.5855e-001$ | $c5 = -2.3887e-005$ | $c6 = 2.5447e-006$ | $c10 = 7.4881e-008$ | $c11 = -5.1152e-007$ |
|     |   | $c12 = 1.0881e-008$ | $c13 = 1.9077e-009$ | $c14 = -6.0163e-010$ | $c20 = 0.0000e+000$ | $c21 = 0.0000e+000$ |
| FFS | 6 | $c1 = -1.6230e+000$ | $c5 = 2.9094e-005$ | $c6 = -2.7549e-006$ | $c10 = -2.6307e-007$ | $c11 = -8.3400e-007$ |
|     |   | $c12 = -5.7294e-009$ | $c13 = 2.5767e-008$ | $c14 = 1.0705e-008$ | $c20 = 0.0000e+000$ | $c21 = 0.0000e+000$ |
| FFS | 7 | $c1 = 7.5855e-001$ | $c5 = -2.3887e-005$ | $c6 = 2.5447e-006$ | $c10 = 7.4881e-008$ | $c11 = -5.1152e-007$ |
|     |   | $c12 = 1.0881e-008$ | $c13 = 1.9077e-009$ | $c14 = -6.0163e-010$ | $c20 = 0.0000e+000$ | $c21 = 0.0000e+000$ |
| FFS | 11 | $c1 = 7.5855e-001$ | $c5 = -2.3887e-005$ | $c6 = 2.5447e-006$ | $c10 = 7.4881e-008$ | $c11 = -5.1152e-007$ |
|     |    | $c12 = 1.0881e-008$ | $c13 = 1.9077e-009$ | $c14 = -6.0163e-010$ | $c20 = 0.0000e+000$ | $c21 = 0.0000e+000$ |
| FFS | 12 | $c1 = -1.6230e+000$ | $c5 = 2.9094e-005$ | $c6 = -2.7549e-006$ | $c10 = -2.6307e-007$ | $c11 = -8.3400e-007$ |
|     |    | $c12 = -5.7294e-009$ | $c13 = 2.5767e-008$ | $c14 = 1.0705e-008$ | $c20 = 0.0000e+000$ | $c21 = 0.0000e+000$ |
| FFS | 13 | $c1 = 7.5855e-001$ | $c5 = -2.3887e-005$ | $c6 = 2.5447e-006$ | $c10 = 7.4881e-008$ | $c11 = -5.1152e-007$ |
|     |    | $c12 = 1.0881e-008$ | $c13 = 1.9077e-009$ | $c14 = -6.0163e-010$ | $c20 = 0.0000e+000$ | $c21 = 0.0000e+000$ |
| FFS | 14 | $c1 = -1.3863e-001$ | $c5 = 2.7102e-005$ | $c6 = -1.4935e-005$ | $c10 = -6.0669e-008$ | $c11 = -1.0467e-007$ |
|     |    | $c12 = 8.8540e-009$ | $c13 = -1.9879e-008$ | $c14 = 1.5218e-009$ | $c20 = 0.0000e+000$ | $c21 = 0.0000e+00$ |
| FFS | 15 | $c1 = -1.3863e-001$ | $c5 = 2.7102e-005$ | $c6 = -1.4935e-005$ | $c10 = -6.0669e-008$ | $c11 = -1.0467e-007$ |
|     |    | $c12 = 8.8540e-009$ | $c13 = -1.9879e-008$ | $c14 = 1.5218e-009$ | $c20 = 0.0000e+000$ | $c21 = 0.0000e+000$ |
| FFS | 16 | $c1 = 8.0803e+001$ | $c5 = -5.8804e-003$ | $c6 = 1.9839e-002$ | $c10 = -6.1826e-006$ | $c11 = 6.8164e-004$ |
|     |    | $c12 = 6.2241e-006$ | $c13 = -1.8201e-005$ | $c14 = -3.1999e-005$ | $c20 = 0.0000e+000$ | $c21 = 0.0000e+000$ |

TABLE 3

| n | point (y, x) | ry | rx |
|---|---|---|---|
| 3 | (0.000, 0.000) | −228.319 | −223.444 |
| 4 | (0.000, 0.000) | −97.942 | −98.996 |
| 5 | (0.000, 0.000) | −228.319 | −223.444 |
| 6 | (0.000, 0.000) | −139.951 | −142.262 |
| 7 | (0.000, 0.000) | −228.319 | −223.444 |
| 8 | | 0.000 | 0.000 |
| 9 | | 0.000 | 0.000 |
| 10 | (0.000, 0.000) | 0.000 | 0.000 |
| 11 | (0.000, 0.000) | −228.319 | −223.444 |
| 12 | (0.000, 0.000) | −139.951 | −142.262 |
| 13 | (0.000, 0.000) | −228.319 | −223.444 |
| 14 | (0.000, 0.000) | −97.942 | −98.996 |
| 15 | (0.000, 0.000) | −97.942 | −98.996 |
| 16 | (0.000, 0.000) | 8.618 | 10.783 |

(local - paraxial axis)

| | n | local-ry | local-rx | local-fy | local-fx | local-d | nd |
|---|---|---|---|---|---|---|---|
| FFS | 3 | −228.63457 | −223.23622 | −400.483 | −391.027 | 14.205 | 1.571 |
| FFS-M | 4 | −98.57569 | −98.68503 | 31.376 | 31.410 | −19.061 | −1.571 |
| FFS-M | 5 | −230.30534 | −220.10042 | −73.304 | −70.056 | 18.206 | 1.571 |
| FFS-M | 6 | −140.55498 | −141.78157 | 44.737 | 45.128 | −13.529 | −1.571 |
| FFS | 7 | −230.41744 | −214.59119 | −403.606 | −375.884 | −0.693 | −1.000 |
| | 8 | 0.00000 | 0.00000 | 0.000 | 0.000 | −5.557 | −1.000 |
| | 9 | 0.00000 | 0.00000 | 0.000 | 0.000 | 0.000 | −1.000 |
| M(dif) | 10 | 0.00000 | 0.00000 | 0.000 | 0.000 | 4.859 | 1.000 |
| FFS | 11 | −230.47715 | −215.21863 | −403.711 | −376.983 | 14.751 | 1.571 |
| FFS-M | 12 | −140.21024 | −141.78700 | 44.627 | 45.129 | −22.338 | −1.571 |
| FFS-M | 13 | −229.38208 | −222.44585 | −73.010 | −70.802 | 16.502 | 1.571 |
| FFS | 14 | −97.96959 | −98.99992 | 171.606 | 173.411 | 0.124 | 1.000 |
| FFS | 15 | −97.97259 | −98.99964 | −171.612 | −173.411 | 2.195 | 1.571 |
| FFS | 16 | 9.34217 | 9.45529 | −16.364 | −16.562 | 0.000 | 1.000 |

| n | hitpoint (y, x) | | |
|---|---|---|---|
| 3 | (1.417, 0.000) | local-fy1 (3-7) | local-fx1 (3-7) |
| 4 | (6.956, 0.000) | 33.368 | 33.914 |
| 5 | (12.563, 0.000) | local-fy2 (11-16) | local-fx2 (11-16) |

TABLE 3-continued

| | | | |
|---|---|---|---|
| 6 | (9.098, 0.000) | −37.534 | −35.671 |
| 7 | (23.494, 0.000) | | |
| 8 | (5.011, 0.000) | | |
| 9 | (4.406, 0.000) | | |
| 10 | (4.406, 0.000) | | |
| 11 | (22.441, 0.000) | | |
| 12 | (5.828, 0.000) | | |
| 13 | (5.293, 0.000) | | |
| 14 | (−1.258, 0.000) | | |
| 15 | (−1.332, 0.000) | | |
| 16 | (2.993, 0.000) | | |

| $2\omega y$ | $2\omega x$ |
|---|---|
| 22.60 | 30.00 |

NUMERICAL EXAMPLE 3

TABLE 4

| | | | | | | | | |
|---|---|---|---|---|---|---|---|---|
| | | | (general - paraxial axis) | | | | | |
| | | n | ry | rx | d | shift | tilt | nd | vd |
| | | 1 | 0.00000 | 0.00000 | 0.000 | 0.000 | 0.000 | 1.000 | |
| | | 2 | 0.00000 | 0.00000 | 30.687 | 0.000 | 0.000 | 1.000 | |
| FFS | | 3 | −235.74643 | −235.74643 | 12.039 | −2.249 | 7.972 | 1.571 | 33.79 |
| FFS-M | | 4 | −101.24199 | −101.24199 | −12.039 | −5.995 | −18.720 | −1.571 | 33.79 |
| FFS-M | | 5 | −235.74643 | −235.74643 | 13.402 | −2.249 | 7.972 | 1.571 | 33.79 |
| FFS-M | | 6 | −145.44898 | −145.44898 | −13.402 | 18.542 | 32.516 | −1.571 | 33.79 |
| FFS | | 7 | −235.74643 | −235.74643 | −2.706 | −2.249 | 7.972 | −1.000 | |
| | | 8 | 0.00000 | 0.00000 | −5.864 | 17.076 | 13.010 | −1.000 | |
| | | 9 | 0.00000 | 0.00000 | 0.000 | 15.721 | 13.010 | −1.000 | |
| M(dif) | | 10 | 0.00000 | 0.00000 | 8.571 | 15.721 | 13.010 | 1.000 | |
| FFS | | 11 | −235.74643 | −235.74643 | 13.402 | −2.249 | 7.972 | 1.571 | 33.79 |
| FFS-M | | 12 | −145.44898 | −145.44898 | −13.402 | 18.542 | 32.516 | −1.571 | 33.79 |
| FFS-M | | 13 | −235.74643 | −235.74643 | 12.039 | −2.249 | 7.972 | 1.571 | 33.79 |
| FFS | | 14 | −101.24199 | −101.24199 | 0.095 | −5.995 | −18.720 | 1.000 | |
| FFS | | 15 | −101.24199 | −101.24199 | −1.376 | −6.027 | −18.720 | 1.571 | 33.79 |
| FFS | | 16 | −56.77775 | −56.77775 | 6.541 | −12.443 | −34.743 | 1.000 | |
| | | 17 | 0.00000 | 0.00000 | 0.000 | −13.329 | −79.743 | 1.000 | |
| | | 18 | 0.00000 | 0.00000 | 0.000 | −13.329 | −79.743 | 1.000 | |

| | | | | | | |
|---|---|---|---|---|---|---|
| FFS | 3 | $c1 = 5.6511e-001$ | $c5 = -1.0202e-005$ | $c6 = -2.4653e-007$ | $c10 = 6.8697e-009$ | $c11 = -2.1865e-007$ |
| | | $c12 = 7.5392e-009$ | $c13 = 5.8819e-010$ | $c14 = -3.7892e-010$ | $c20 = 0.0000e+000$ | $c21 = 0.0000e+000$ |
| FFS | 4 | $c1 = -2.9858e-001$ | $c5 = 2.2549e-005$ | $c6 = -4.4657e-006$ | $c10 = 3.1926e-008$ | $c11 = -1.3988e-007$ |
| | | $c12 = 9.0047e-009$ | $c13 = 1.3057e-009$ | $c14 = 5.3269e-009$ | $c20 = 0.0000e+000$ | $c21 = 0.0000e+000$ |
| FFS | 5 | $c1 = 5.6511e-001$ | $c5 = -1.0202e-005$ | $c6 = -2.4653e-007$ | $c10 = 6.8697e-009$ | $c11 = -2.1865e-007$ |
| | | $c12 = 7.5392e-009$ | $c13 = 5.8819e-010$ | $c14 = -3.7892e-010$ | $c20 = 0.0000e+000$ | $c21 = 0.0000e+000$ |
| FFS | 6 | $c1 = -1.0655e+000$ | $c5 = 2.4976e-005$ | $c6 = 8.4041e-007$ | $c10 = 2.1486e-008$ | $c11 = -6.6509e-007$ |
| | | $c12 = -8.5225e-010$ | $c13 = 3.2902e-008$ | $c14 = 6.5401e-009$ | $c20 = 0.0000e+000$ | $c21 = 0.0000e+000$ |
| FFS | 7 | $c1 = 5.6511e-001$ | $c5 = -1.0202e-005$ | $c6 = -2.4653e-007$ | $c10 = 6.8697e-009$ | $c11 = -2.1865e-007$ |
| | | $c12 = 7.5392e-009$ | $c13 = 5.8819e-010$ | $c14 = -3.7892e-010$ | $c20 = 0.0000e+000$ | $c21 = 0.0000e+000$ |
| FFS | 11 | $c1 = 5.6511e-001$ | $c5 = -1.0202e-005$ | $c6 = -2.4653e-007$ | $c10 = 6.8697e-009$ | $c11 = -2.1865e-007$ |
| | | $c12 = 7.5392e-009$ | $c13 = 5.8819e-010$ | $c14 = -3.7892e-010$ | $c20 = 0.0000e+000$ | $c21 = 0.0000e+000$ |
| FFS | 12 | $c1 = -1.0655e+000$ | $c5 = 2.4976e-005$ | $c6 = 8.4041e-007$ | $c10 = 2.1486e-008$ | $c11 = -6.6509e-007$ |
| | | $c12 = -8.5225e-010$ | $c13 = 3.2902e-008$ | $c14 = 6.5401e-009$ | $c20 = 0.0000e+000$ | $c21 = 0.0000e+000$ |
| FFS | 13 | $c1 = 5.6511e-001$ | $c5 = -1.0202e-005$ | $c6 = -2.4653e-007$ | $c10 = 6.8697e-009$ | $c11 = -2.1865e-007$ |
| | | $c12 = 7.5392e-009$ | $c13 = 5.8819e-010$ | $c14 = -3.7892e-010$ | $c20 = 0.0000e+000$ | $c21 = 0.0000e+000$ |
| FFS | 14 | $c1 = -2.9858e-001$ | $c5 = 2.2549e-005$ | $c6 = -4.4657e-006$ | $c10 = 3.1926e-008$ | $c11 = -1.3988e-007$ |
| | | $c12 = 9.0047e-009$ | $c13 = 1.3057e-009$ | $c14 = 5.3269e-009$ | $c20 = 0.0000e+000$ | $c21 = 0.0000e+000$ |
| FFS | 15 | $c1 = -2.9858e-001$ | $c5 = 2.2549e-005$ | $c6 = -4.4657e-006$ | $c10 = 3.1926e-008$ | $c11 = -1.3988e-007$ |
| | | $c12 = 9.0047e-009$ | $c13 = 1.3057e-009$ | $c14 = 5.3269e-009$ | $c20 = 0.0000e+000$ | $c21 = 0.0000e+000$ |
| FFS | 16 | $c1 = 2.8656e+001$ | $c5 = 3.6255e-003$ | $c6 = 3.1639e-003$ | $c10 = 8.1305e-005$ | $c11 = 1.3427e-003$ |
| | | $c12 = 7.2718e-006$ | $c13 = -7.4404e-005$ | $c14 = 2.8531e-005$ | $c20 = 0.0000e+000$ | $c21 = 0.0000e+000$ |

TABLE 5

| n | point (y, x) | ry | rx |
|---|---|---|---|
| 3 | (0.000, 0.000) | −236.831 | −234.564 |
| 4 | (0.000, 0.000) | −100.600 | −101.521 |
| 5 | (0.000, 0.000) | −236.831 | −234.564 |

TABLE 5-continued

|  | | | |
|---|---|---|---|
| 6 | (0.000, 0.000) | −144.473 | −146.580 |
| 7 | (0.000, 0.000) | −236.831 | −234.564 |
| 8 | (0.000, 0.000) | 0.000 | 0.000 |
| 9 | (0.000, 0.000) | 0.000 | 0.000 |
| 10 | (0.000, 0.000) | 0.000 | 0.000 |
| 11 | (0.000, 0.000) | −236.831 | −234.564 |
| 12 | (0.000, 0.000) | −144.473 | −146.580 |
| 13 | (0.000, 0.000) | −236.831 | −234.564 |
| 14 | (0.000, 0.000) | −100.600 | −101.521 |
| 15 | (0.000, 0.000) | −100.600 | −101.521 |
| 16 | (0.000, 0.000) | −76.942 | 417.000 |

(local - paraxial axis)

|  | n | local-ry | local-rx | local-fy | local-fx | local-d | nd |
|---|---|---|---|---|---|---|---|
| FFS | 3 | −237.00520 | −234.35937 | −415.145 | −410.511 | 14.420 | 1.571 |
| FFS-M | 4 | −101.14916 | −101.30990 | 32.195 | 32.246 | −19.390 | −1.571 |
| FFS-M | 5 | −237.58946 | −232.00654 | −75.622 | −73.845 | 18.267 | 1.571 |
| FFS-M | 6 | −144.27221 | −146.14060 | 45.920 | 46.515 | −13.531 | −1.571 |
| FFS | 7 | −237.63417 | −227.61860 | −416.247 | −398.704 | −0.835 | −1.000 |
|  | 8 | 0.00000 | 0.00000 | 0.000 | 0.000 | −6.055 | −1.000 |
|  | 9 | 0.00000 | 0.00000 | 0.000 | 0.000 | 0.000 | −1.000 |
| M(dif) | 10 | 0.00000 | 0.00000 | 0.000 | 0.000 | 5.236 | 1.000 |
| FFS | 11 | −237.65632 | −228.14995 | −416.286 | −399.634 | 14.796 | 1.571 |
| FFS-M | 12 | −144.58462 | −146.22502 | 46.020 | 46.542 | −22.445 | −1.571 |
| FFS-M | 13 | −237.26445 | −233.78864 | −75.519 | −74.412 | 16.773 | 1.571 |
| FFS | 14 | −100.59644 | −101.52447 | 176.208 | 177.833 | 0.124 | 1.000 |
| FFS | 15 | −100.59699 | −101.52418 | −176.209 | −177.833 | 2.134 | 1.571 |
| FFS | 16 | 14.79108 | 19.45830 | −25.909 | −34.084 | 0.000 | 1.000 |

| n | hitpoint(y, x) | | |
|---|---|---|---|
| 3 | (2.273, 0.000) | local-fy1 (3-7) | local-fx1 (3-7) |
| 4 | (7.071, 0.000) | 34.048 | 34.458 |
| 5 | (13.637, 0.000) | local-fy2 (11-16) | local-fx2 (11-16) |
| 6 | (9.236, 0.000) | −72.568 | −111.354 |
| 7 | (24.812, 0.000) | | |
| 8 | (5.482, 0.000) | | |
| 9 | (4.825, 0.000) | | |
| 10 | (4.825, 0.000) | | |
| 11 | (23.683, 0.000) | | |
| 12 | (5.875, 0.000) | | |
| 13 | (6.239, 0.000) | | |
| 14 | (−1.255, 0.000) | | |
| 15 | (−1.329, 0.000) | | |
| 16 | (4.528, 0.000) | | |

| $2\omega y$ | $2\omega x$ |
|---|---|
| 22.60 | 30.00 |

NUMERICAL EXAMPLE 4

TABLE 6

(general - paraxial axis)

|  | n | ry | rx | d | shift | tilt | nd | vd |
|---|---|---|---|---|---|---|---|---|
|  | 1 | 0.00000 | 0.00000 | 0.000 | 0.000 | 0.000 | 1.000 |  |
|  | 2 | 0.00000 | 0.00000 | 30.968 | 0.000 | 0.000 | 1.000 |  |
| FFS | 3 | −285.68584 | −285.68584 | 11.495 | −1.507 | 6.765 | 1.571 | 33.79 |
| FFS-M | 4 | −107.97011 | −107.97011 | −11.495 | −2.563 | −17.850 | −1.571 | 33.79 |
| FFS-M | 5 | −285.68584 | −285.68584 | 14.423 | −1.507 | 6.765 | 1.571 | 33.79 |
| FFS-M | 6 | −144.91698 | −144.91698 | −14.423 | 19.309 | 34.124 | −1.571 | 33.79 |
| FFS | 7 | −285.68584 | −285.68584 | −2.004 | −1.507 | 6.765 | −1.000 |  |
|  | 8 | 0.00000 | 0.00000 | −5.017 | 15.386 | 22.559 | −1.000 |  |
|  | 9 | 0.00000 | 0.00000 | 0.000 | 13.302 | 22.559 | −1.000 |  |
| M(dif) | 10 | 0.00000 | 0.00000 | 7.020 | 13.302 | 22.559 | 1.000 |  |
| FFS | 11 | −285.68584 | −285.68584 | 14.423 | −1.507 | 6.765 | 1.571 | 33.79 |
| FFS-M | 12 | −144.91698 | −144.91698 | −14.423 | 19.309 | 34.124 | −1.571 | 33.79 |
| FFS-M | 13 | −285.68584 | −285.68584 | 11.495 | −1.507 | 6.765 | 1.571 | 33.79 |
| FFS | 14 | −107.97011 | −107.97011 | 0.095 | −2.563 | −17.850 | 1.000 |  |
|  | 15 | 0.00000 | 0.00000 | 0.000 | −2.594 | −17.850 | 1.000 |  |

TABLE 6-continued

| | | | | | | | |
|---|---|---|---|---|---|---|---|
| | 16 | 0.00000 | 0.00000 | −0.018 | −2.594 | −17.850 | 1.000 |
| | 17 | 0.00000 | 0.00000 | 3.288 | −2.650 | −47.850 | 1.000 |
| | 18 | 0.00000 | 0.00000 | 0.000 | −6.282 | −47.850 | 1.000 |

| | | | | | | |
|---|---|---|---|---|---|---|
| FFS | 3 | c1 = −1.1092e+000 | c5 = −3.7224e−005 | c6 = 1.5705e−005 | c10 = 1.3602e−008 | c11 = −2.3762e−007 |
| | | c12 = 1.7125e−008 | c13 = −2.8881e−009 | c14 = −2.6509e−009 | c20 = 0.0000e+000 | c21 = 0.0000e+000 |
| FFS | 4 | c1 = 2.9901e−001 | c5 = −1.9656e−005 | c6 = −1.1993e−005 | c10 = 2.1235e−006 | c11 = −5.0365e−007 |
| | | c12 = 6.7824e−009 | c13 = −1.6399e−008 | c14 = −6.0722e−009 | c20 = 0.0000e+000 | c21 = 0.0000e+000 |
| FFS | 5 | c1 = −1.1092e+000 | c5 = −3.7224e−005 | c6 = 1.5705e−005 | c10 = 1.3602e−008 | c11 = −2.3762e−007 |
| | | c12 = 1.7125e−008 | c13 = −2.8881e−009 | c14 = −2.6509e−009 | c20 = 0.0000e+000 | c21 = 0.0000e+000 |
| FFS | 6 | c1 = −3.1468e+000 | c5 = −1.2048e−005 | c6 = −5.8799e−006 | c10 = −2.9942e−007 | c11 = −4.0072e−007 |
| | | c12 = −2.6769e−009 | c13 = 1.2558e−008 | c14 = 2.0155e−008 | c20 = 0.0000e+000 | c21 = 0.0000e+000 |
| FFS | 7 | c1 = −1.1092e+000 | c5 = −3.7224e−005 | c6 = 1.5705e−005 | c10 = 1.3602e−008 | c11 = −2.3762e−007 |
| | | c12 = 1.7125e−008 | c13 = −2.8881e−009 | c14 = −2.6509e−009 | c20 = 0.0000e+000 | c21 = 0.0000e+000 |
| FFS | 11 | c1 = −1.1092e+000 | c5 = −3.7224e−005 | c6 = 1.5705e−005 | c10 = 1.3602e−008 | c11 = −2.3762e−007 |
| | | c12 = 1.7125e−008 | c13 = −2.8881e−009 | c14 = −2.6509e−009 | c20 = 0.0000e+000 | c21 = 0.0000e+000 |
| FFS | 12 | c1 = −3.1468e+000 | c5 = −1.2048e−005 | c6 = −5.8799e−006 | c10 = −2.9942e−007 | c11 = −4.0072e−007 |
| | | c12 = −2.6769e−009 | c13 = 1.2558e−008 | c14 = 2.0155e−008 | c20 = 0.0000e+000 | c21 = 0.0000e+000 |
| FFS | 13 | c1 = −1.1092e+000 | c5 = −3.7224e−005 | c6 = 1.5705e−005 | c10 = 1.3602e−008 | c11 = −2.3762e−007 |
| | | c12 = 1.7125e−008 | c13 = −2.8881e−009 | c14 = −2.6509e−009 | c20 = 0.0000e+000 | c21 = 0.0000e+000 |
| FFS | 14 | c1 = 2.9901e−001 | c5 = −1.9656e−005 | c6 = −1.1993e−005 | c10 = 2.1235e−006 | c11 = −5.0365e−007 |
| | | c12 = 6.7824e−009 | c13 = −1.6399e−008 | c14 = −6.0722e−009 | c20 = 0.0000e+000 | c21 = 0.0000e+000 |

TABLE 7

| n | point (y, x) | ry | rx |
|---|---|---|---|
| 3 | (0.000, 0.000) | −297.348 | −284.744 |
| 4 | (0.000, 0.000) | −107.869 | −106.964 |
| 5 | (0.000, 0.000) | −297.348 | −284.744 |
| 6 | (0.000, 0.000) | −144.926 | −143.917 |
| 7 | (0.000, 0.000) | −297.348 | −284.744 |
| 8 | (0.000, 0.000) | 0.000 | 0.000 |
| 9 | (0.000, 0.000) | 0.000 | 0.000 |
| 10 | (0.000, 0.000) | 0.000 | 0.000 |
| 11 | (0.000, 0.000) | −297.348 | −284.744 |
| 12 | (0.000, 0.000) | −144.926 | −143.917 |
| 13 | (0.000, 0.000) | −297.348 | −284.744 |
| 14 | (0.000, 0.000) | −107.869 | −106.964 |

| | | (local − paraxial axis) | | | | | |
|---|---|---|---|---|---|---|---|
| | n | local-ry | local-rx | local-fy | local-fx | local-d | nd |
| FFS | 3 | −297.61643 | −284.52903 | −521.314 | −498.390 | 12.647 | 1.571 |
| FFS-M | 4 | −109.46838 | −107.23751 | 34.843 | 34.133 | −17.180 | −1.571 |
| FFS-M | 5 | −301.93694 | −280.39190 | −96.103 | −89.246 | 19.132 | 1.571 |
| FFS-M | 6 | −147.47736 | −144.33143 | 46.941 | 45.939 | −14.292 | −1.571 |
| FFS | 7 | −310.46712 | −272.25815 | −543.824 | −476.896 | −0.619 | −1.000 |
| | 8 | 0.00000 | 0.00000 | 0.000 | 0.000 | −5.453 | −1.000 |
| | 9 | 0.00000 | 0.00000 | 0.000 | 0.000 | 0.000 | −1.000 |
| M(dif) | 10 | 0.00000 | 0.00000 | 0.000 | 0.000 | 5.857 | 1.000 |
| FFS | 11 | −309.37148 | −273.27291 | −541.904 | −478.673 | 15.324 | 1.571 |
| FFS-M | 12 | −145.84193 | −143.92844 | 46.420 | 45.811 | −22.665 | −1.571 |
| FFS-M | 13 | −298.89525 | −283.35417 | −95.135 | −90.189 | 14.965 | 1.571 |
| FFS | 14 | −106.40162 | −106.53507 | 186.376 | 186.610 | 0.000 | 1.000 |

| n | hitpoint(y, x) | | |
|---|---|---|---|
| 3 | (1.518, 0.000) | local-fy1 (3-7) | local-fx1 (3-7) |
| 4 | (3.273, 0.000) | 33.848 | 33.749 |
| 5 | (11.996, 0.000) | local-fy2 (11-16) | local-fx2 (11-16) |
| 6 | (7.796, 0.000) | 63.685 | 64.979 |
| 7 | (22.180, 0.000) | | |
| 8 | (5.143, 0.000) | | |
| 9 | (4.669, 0.000) | | |
| 10 | (4.669, 0.000) | | |
| 11 | (21.123, 0.000) | | |
| 12 | (4.965, 0.000) | | |
| 13 | (5.902, 0.000) | | |
| 14 | (−3.126, 0.000) | | |

| 2ωy | 2ωx |
|---|---|
| 22.60 | 30.00 |

NUMERICAL EXAMPLE 5

TABLE 8

(general - paraxial axis)

| | n | ry | rx | d | shift | tilt | nd | vd |
|---|---|---|---|---|---|---|---|---|
| | 1 | 0.00000 | 0.00000 | 0.000 | 0.000 | 0.000 | 1.000 | |
| | 2 | 0.00000 | 0.00000 | 30.305 | 0.000 | 0.000 | 1.000 | |
| FFS | 3 | −290.96372 | −290.96372 | 12.014 | −1.497 | 7.407 | 1.571 | 33.79 |
| FFS-M | 4 | −105.23909 | −105.23909 | −12.014 | −3.573 | −17.991 | −1.571 | 33.79 |
| FFS-M | 5 | −290.96372 | −290.96372 | 13.792 | −1.497 | 7.407 | 1.571 | 33.79 |
| FFS-M | 6 | −156.42423 | −156.42423 | −13.792 | 19.685 | 32.947 | −1.571 | 33.79 |
| FFS | 7 | −290.96372 | −290.96372 | −2.438 | −1.497 | 7.407 | −1.000 | |
| | 8 | 0.00000 | 0.00000 | −4.865 | 17.261 | 18.445 | −1.000 | |
| | 9 | 0.00000 | 0.00000 | 0.000 | 15.638 | 18.445 | −1.000 | |
| M(dif) | 10 | 0.00000 | 0.00000 | 7.303 | 15.638 | 18.445 | 1.000 | |
| FFS | 11 | −290.96372 | −290.96372 | 13.792 | −1.497 | 7.407 | 1.571 | 33.79 |
| FFS-M | 12 | −156.42423 | −156.42423 | −13.792 | 19.685 | 32.947 | −1.571 | 33.79 |
| FFS-M | 13 | −290.96372 | −290.96372 | 12.014 | −1.497 | 7.407 | 1.571 | 33.79 |
| FFS | 14 | −105.23909 | −105.23909 | −0.550 | −3.573 | −17.991 | 1.000 | |
| | 15 | 0.00000 | 0.00000 | 3.797 | −5.590 | −52.499 | 1.000 | |
| | 16 | 0.00000 | 0.00000 | 0.000 | −10.538 | −52.499 | 1.000 | |

| | | | | | | |
|---|---|---|---|---|---|---|
| FFS | 3 | $c1 = -1.5664e+000$ | $c5 = -2.5028e-005$ | $c6 = 1.0818e-005$ | $c10 = -2.2845e-008$ | $c11 = -5.6493e-008$ |
| | | $c12 = 1.4504e-008$ | $c13 = -1.9873e-009$ | $c14 = -2.3637e-009$ | $c20 = 0.0000e+000$ | $c21 = 0.0000e+000$ |
| FFS | 4 | $c1 = 8.0932e-002$ | $c5 = -1.4104e-005$ | $c6 = -8.9932e-006$ | $c10 = 1.0146e-006$ | $c11 = -3.2314e-007$ |
| | | $c12 = -6.6075e-009$ | $c13 = -1.6086e-008$ | $c14 = -8.2767e-010$ | $c20 = 0.0000e+000$ | $c21 = 0.0000e+000$ |
| FFS | 5 | $c1 = -1.5664e+000$ | $c5 = -2.5028e-005$ | $c5 = 1.0818e-005$ | $c10 = -2.2845e-008$ | $c11 = -5.6493e-008$ |
| | | $c12 = 1.4504e-008$ | $c13 = -1.9873e-009$ | $c14 = -2.3637e-009$ | $c20 = 0.0000e+000$ | $c21 = 0.0000e+000$ |
| FFS | 6 | $c1 = -3.9310e+000$ | $c5 = -7.6391e-006$ | $c6 = -7.6616e-006$ | $c10 = -7.4019e-008$ | $c11 = -1.1410e-007$ |
| | | $c12 = 2.7298e-009$ | $c13 = 1.2996e-008$ | $c14 = 1.9931e-008$ | $c20 = 0.0000e+000$ | $c21 = 0.0000e+000$ |
| FFS | 7 | $c1 = -1.5664e+000$ | $c5 = -2.5028e-005$ | $c6 = 1.0818e-005$ | $c10 = -2.2845e-008$ | $c11 = -5.6493e-008$ |
| | | $c12 = 1.4504e-008$ | $c13 = -1.9873e-009$ | $c14 = -2.3637e-009$ | $c20 = 0.0000e+000$ | $c21 = 0.0000e+000$ |
| FFS | 11 | $c1 = -1.5664e+000$ | $c5 = -2.5028e-005$ | $c6 = 1.0818e-005$ | $c10 = -2.2845e-008$ | $c11 = -5.6493e-008$ |
| | | $c12 = 1.4504e-008$ | $c13 = -1.9873e-009$ | $c14 = -2.3637e-009$ | $c20 = 0.0000e+000$ | $c21 = 0.0000e+000$ |
| FFS | 12 | $c1 = -3.9310e+000$ | $c5 = -7.6391e-006$ | $c6 = -7.6616e-006$ | $c10 = -7.4019e-008$ | $c11 = -1.1410e-007$ |
| | | $c12 = 2.7298e-009$ | $c13 = 1.2996e-008$ | $c14 = 1.9931e-008$ | $c20 = 0.0000e+000$ | $c21 = 0.0000e+000$ |
| FFS | 13 | $c1 = -1.5664e+000$ | $c5 = -2.5028e-005$ | $c6 = 1.0818e-005$ | $c10 = -2.2845e-008$ | $c11 = -5.6493e-008$ |
| | | $c12 = 1.4504e-008$ | $c13 = -1.9873e-009$ | $c14 = -2.3637e-009$ | $c20 = 0.0000e+000$ | $c21 = 0.0000e+000$ |
| FFS | 14 | $c1 = 8.0932e-002$ | $c5 = -1.4104e-005$ | $c6 = -8.9932e-006$ | $c10 = 1.0146e-006$ | $c11 = -3.2314e-007$ |
| | | $c12 = 6.6075e-009$ | $c13 = -1.6086e-008$ | $c14 = -8.2767e-010$ | $c20 = 0.0000e+000$ | $c21 = -0.0000e+000$ |

| n | point (y, x) | ry | rx |
|---|---|---|---|
| 3 | (0.000, 0.000) | −299.087 | −290.394 |
| 4 | (0.000, 0.000) | −105.152 | −104.534 |
| 5 | (0.000, 0.000) | −299.087 | −290.394 |
| 6 | (0.000, 0.000) | −156.045 | −155.301 |
| 7 | (0.000, 0.000) | −299.087 | −290.394 |
| 8 | (0.000, 0.000) | 0.000 | 0.000 |
| 9 | (0.000, 0.000) | 0.000 | 0.000 |
| 10 | (0.000, 0.000) | 0.000 | 0.000 |
| 11 | (0.000, 0.000) | −299.087 | −290.394 |
| 12 | (0.000, 0.000) | −156.045 | −155.301 |
| 13 | (0.000, 0.000) | −299.087 | −290.394 |
| 14 | (0.000, 0.000) | −105.152 | −104.534 |

TABLE 9

(local - paraxial axis)

| | n | local-ry | local-rx | local-fy | local-fx | local-d | nd |
|---|---|---|---|---|---|---|---|
| FFS | 3 | −299.11588 | −290.29089 | −523.940 | −508.482 | 13.507 | 1.571 |
| FPS-M | 4 | −106.29567 | −104.61434 | 33.833 | 33.298 | −18.292 | −1.571 |
| FFS-M | 5 | −301.68132 | −287.03011 | −96.022 | −91.359 | 18.953 | 1.571 |
| FFS-M | 6 | −159.51836 | −156.31374 | 50.773 | 49.753 | −14.028 | −1.571 |
| FFS | 7 | −308.56901 | −279.54890 | −540.499 | −489.666 | −0.012 | −1.000 |
| | 8 | 0.00000 | 0.00000 | 0.000 | 0.000 | −5.136 | −1.000 |
| | 9 | 0.00000 | 0.00000 | 0.000 | 0.000 | 0.000 | −1.000 |
| M(dif) | 10 | 0.00000 | 0.00000 | 0.000 | 0.000 | 5.061 | 1.000 |
| FFS | 11 | −308.12282 | −280.00965 | −539.717 | −490.473 | 14.611 | 1.571 |
| FFS-M | 12 | −158.19419 | −155.90021 | 50.352 | 49.621 | −20.954 | −1.571 |
| FFS-M | 13 | −300.39581 | −288.56094 | −95.613 | −91.846 | 17.075 | 1.571 |
| FFS | 14 | −105.24886 | −104.55235 | 184.357 | 183.137 | 0.000 | 1.000 |

TABLE 9-continued

| n | hitpoint (y, x) | | |
|---|---|---|---|
| 3 | (1.510, 0.000) | local-fy1 (3-7) | local-fx1 (3-7) |
| 4 | (4.422, 0.000) | 34.214 | 34.028 |
| 5 | (12.524, 0.000) | local-fy2 (11-16) | local-fx2 (11-16) |
| 6 | (7.821, 0.000) | 72.175 | 72.961 |
| 7 | (23.620, 0.000) | | |
| 8 | (4.795, 0.000) | | |
| 9 | (4.519, 0.000) | | |
| 10 | (4.519, 0.000) | | |
| 11 | (28.070, 0.000) | | |
| 12 | (6.195, 0.000) | | |
| 13 | (8.962, 0.000) | | |
| 14 | (0.426, 0.000) | | |

| 2ωy | 2ωx |
|---|---|
| 22.60 | 30.00 |

Figure 8:
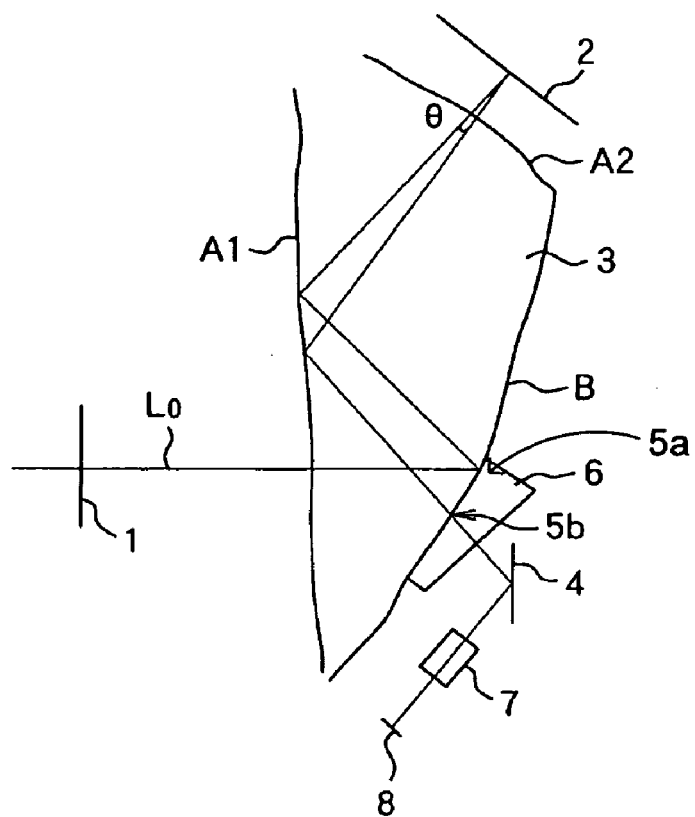
FIG. 8 is a view showing beam paths of the scanning optical system which is Embodiment 6 of the present invention.

(Embodiment 6) FIG. 8 shows a structure of the scanning optical system which is Embodiment 6 of the present invention and a section of an optical path of a central principal ray. In this embodiment, members having the same reference characters as in Embodiments 1 to 5 are identical to the members of Embodiments 1 to 5 excluding the reciprocating prism 3.

Light from the light source 8 is changed into substantially parallel light beam by the collimator lens 7, is then reflected and deflected by the two-dimensional scanning mirror 4, then passes through the correcting prism 6 as a light beam which forms a field angle, and is made incident into the reciprocating prism 3 from the transmissive area 5b of the reflective surface B of the reciprocating prism 3.

The surface B of the reciprocating prism 3 functions as an incident surface of light from the two-dimensional scanning mirror 4 and as the final reflective surface to the exit pupil 1. As in Embodiments 1 to 5, the surface B has the transmissive area 5b shown in FIGS. 7A and 7B in the reflective area 5a.

The surface A1 is a reflective surface which reflects incident light from the transmissive area 5b of the surface B, then guides the light to the surface A2, and reflects the light from the surface A2 so as to be returned again to the surface B. The surface A1 also functions as an emergent surface to emerge light reflected by the surface B from the reciprocating prism 3.

The surface A2 is a transmissive surface through which light from the surface A1 passes and from which light from the surface A1 is emerged and through which light reflected by the diffuse-reflective surface 2 passes so as to be made incident again into the reciprocating prism 3.

The diffuse-reflective surface 2 is a returning reflective surface which diffuses incident light and which reflects the incident light so as to be returned in a substantially opposite direction.

The light beam made incident into the reciprocating prism 3 from the transmissive area 5b of the surface B is made incident to the surface A1 at an incident angle greater than its critical angle, then undergoes an internal total reflection, then passes through the surface A2, and reaches the diffuse-reflective surface 2. At this time, the light beam forms an intermediate image on the diffuse-reflective surface 2 or at a position close to this. The light beam diffused and reflected by the diffuse-reflective surface 2 again passes through the surface A2, is then made incident into the reciprocating prism 3, then is made incident to the surface A1 at an incident angle greater than the critical angle, then undergoes an internal total reflection, is then reflected by the reflective area 5a of the surface B, is then emerged from the reciprocating prism 3 through the surface A1, and reaches the exit pupil 1. An angle between incident light and reflected light of the central principal ray L0 on the diffuse-reflective surface 2 is θ.

In the reciprocating prism 3, light travels to each surface in the following order: surface B (transmission of the transmissive area 5b)→surface A1 (reflection)→surface A2 (transmission)→diffuse-reflective surface 2 (returning reflection+diffusion)→surface A2 (re-transmission)→surface A1 (re-transmission)→surface B (reflection by reflective area 5a)→surface A1 (transmission). With the reflection caused by the returning reflective surface as a turning point, the light follows the optical path, along which the light has traveled, in the opposite direction. A route from surface B (transmission of transmissive area 5b) to the returning reflective surface is the first optical path, and a route from the returning reflective surface to surface B (reflection) is the second optical path. A to-and-fro optical path is formed in which the first optical path and the second optical path almost exactly overlap each other.

Preferably, the range of angle θ formed by the incidence and reflection of the central principal ray L0 with respect to the diffuse-reflective surface 2 which is a returning reflective surface is:

$$|\theta| < 45° \tag{4}$$

If this condition is exceeded, it undesirably becomes difficult to form the to-and-fro optical path by the returning reflection. On the other hand, if a structure is formed to satisfy the relationship (4), the to-and-fro optical path by the returning reflection is formed regardless of arrangement, structure, etc., of the other surfaces, and therefore the size of the optical system with respect to the optical path length can be relatively easily reduced.

More preferably, angle θ is:

$$|\theta| < 30° \tag{5}$$

If this condition is satisfied, the overlapping degree between the forward route (first route) and the return route (second route) will be heightened, and therefore the optical system can be made more compact.

Figure 9:
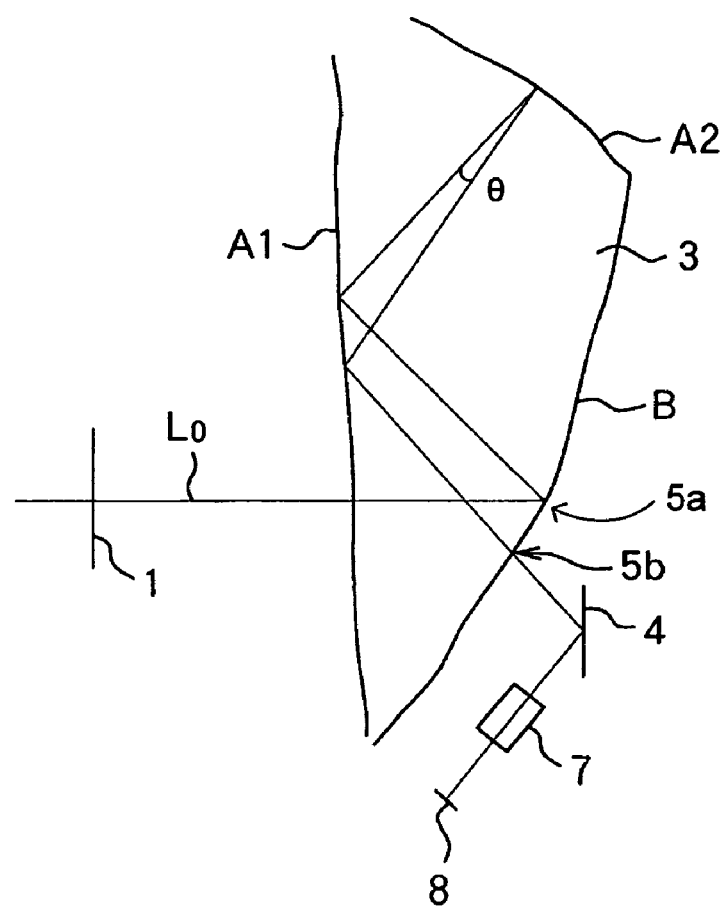
FIG. 9 is a view showing beam paths of the scanning optical system which is Embodiment 7 of the present invention.
Figure 9:
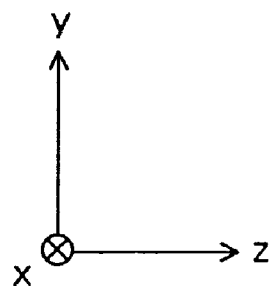

(Embodiment 7) FIG. 9 shows a structure of the scanning optical system which is Embodiment 7 of the present invention and a section of an optical path of a central principal ray. In this embodiment, members having the same reference characters as in Embodiments 1 to 5 are identical to the members of Embodiments 1 to 5 excluding the reciprocating prism 3.

Light from the light source 8 is changed into a substantially parallel light beam by the collimator lens 7, is then reflected and deflected by the two-dimensional scanning mirror 4, and, as a light beam which forms a field angle, is made incident into the reciprocating prism 3 from the transmissive area 5b of the surface B of the reciprocating prism 3.

The surface B of the reciprocating prism 3 functions as an incident surface of light from the two-dimensional scanning mirror 4 and as the final reflective surface toward the exit pupil 1. As in Embodiments 1 to 5, the surface B has the transmissive area 5b shown in FIGS. 7A and 7B in the reflective area 5a.

The surface A1 is a reflective surface which reflects incident light from the transmissive area 5b of the surface B, then guides the light to the surface A2, and reflects light from the surface A2 so as to be returned again to the surface B. The surface A1 also functions as an emergent surface to emerge light reflected by the surface B from the reciprocating prism 3.

The surface A2 is a diffuse-reflective surface and is a returning reflective surface which reflects incident light from the surface A1 so as to be returned in a substantially opposite direction.

The light beam made incident into the reciprocating prism 3 from the transmissive area 5b of the surface B is made incident to the surface A1 at an incident angle greater than its critical angle, then undergoes an internal total reflection, and reaches the surface A2. At this time, the light beam forms an intermediate image on the surface A2 or at a position close to this. The light beam diffused and reflected by the surface A2 again is made incident to the surface A1 at an incident angle greater than the critical angle, then undergoes an internal total reflection, is then reflected by the reflective area 5a of the surface B, is then emerged from the reciprocating prism 3 through the surface A1, and reaches the exit pupil 1. An angle between incident light and reflected light of the central principal ray L0 on the surface A2 is θ, and satisfies the aforementioned relationship (4) or (5).

In the reciprocating prism 3, light travels to each surface in the following order: surface B (transmission of the transmissive area 5b)→surface A1 (reflection)→surface A2 (returning reflection+diffusion)→surface A1 (re-reflection) →surface B (reflection by reflective area 5a)→surface A1 (transmission). With the reflection caused by the returning reflective surface as a turning point, the light follows the optical path, along which the light has traveled, in the opposite direction.

A route from the surface B (transmission of transmissive area 5b) to the returning reflective surface is the first optical path, and a route from the returning reflective surface to the surface B (reflection) is the second optical path. A to-and-fro optical path is formed in which the first optical path and the second optical path almost exactly overlap each other.

As described above, according to each embodiment, the scanning optical system which scans light and displays an image can be made smaller in size than conventional optical systems while sufficiently enlarging an exit pupil.

While preferred embodiments have been described, it is to be understood that modification and variation of the present invention may be made without departing from scope of the following claims.

What is claimed is:

1. A scanning optical system comprising:
   a scanning device which scans light from a light source, and
   a first optical system which directs the light scanned by the scanning device to an exit pupil,
   wherein the first optical system comprises a first surface and a second surface, the first surface having at least a reflective action and being decentered with respect to a central principal ray, the second surface reflecting light reflected by the first surface toward the first surface,
   wherein the first surface reflects the central principal ray, which has again been made incident to the first surface from the second surface, toward a side substantially opposite to a side toward which the central principal ray was reflected the last time with respect to a normal on a hit point of the central principal ray on the first surface, and
   wherein the first optical system makes the light from the scanning device form an intermediate image, and a diffuse-reflective surface serving as the second surface is disposed at one of the positions of the intermediate image and in the vicinity of the intermediate image.

2. The scanning optical system according to claim 1, wherein the the first optical system further comprises a third surface in which a reflective area and a transmissive area are formed, the transmissive area allowing the light from the scanning device to be made incident into the first optical system, and wherein the transmissive area is smaller in area than the reflective area.

3. The scanning optical system according to claim 1, wherein the first optical system further comprises a third surface, and the third surface reflects light which has proceeded from a first optical path including a first reflection on the first surface to a second optical path including a reflection on the first surface after being reflected by the second surface, thus forming an optical path differing from the first optical path.

4. The scanning optical system according to claim 1, wherein the scanning device is disposed at a position conjugated with the exit pupil, and the light from the scanning device forms a two-dimensional image at a position of the intermediate image.

5. The scanning optical system according to claim 1, wherein the scanning device is formed of a reflective member scannable in a two-dimensional direction.

6. A scan type image display apparatus comprising:
   the scanning optical system according to claim 1; and
   a drive circuit which drives the scanning device.

7. An image display system comprising:
   the scan type image display apparatus according to claim 6; and
   an image-information supply apparatus which supplies image information to the image display apparatus.

8. A scanning optical system comprising:
   a scanning device which scans light from a light source, and
   a first optical system which directs the light scanned by the scanning device to an exit pupil,
   wherein the first optical system comprises a first surface, a second surface and a third surface, the first surface having at least a reflective action and being decentered with respect to a central principal ray, the second surface reflecting light reflected by the first surface toward the first surface, third surface in which a reflective area and a transmissive area are formed, the transmissive area allowing the light from the scanning device to be made incident into the first optical system,
wherein the first surface reflects the central principal ray, which has again been made incident to the first surface from the second surface, toward a side substantially opposite to a side toward which the central principal ray was reflected the last time with respect to a normal on a hit point of the central principal ray on the first surface, and wherein the transmissive area is smaller in area than the reflective area.

* * * * *